(12) United States Patent
Ohori et al.

(10) Patent No.: US 12,470,100 B2
(45) Date of Patent: Nov. 11, 2025

(54) ROTOR, MOTOR, AND METHOD FOR MANUFACTURING ROTOR

(71) Applicant: MITSUBA Corporation, Gunma (JP)

(72) Inventors: Ryo Ohori, Gunma (JP); Koji Yonekawa, Gunma (JP); Takeshi Kanai, Gunma (JP)

(73) Assignee: MITSUBA Corporation, Gunma (JP)

( * ) Notice: Subject to any disclaimer, the term of this patent is extended or adjusted under 35 U.S.C. 154(b) by 0 days.

(21) Appl. No.: 18/584,964

(22) Filed: Feb. 22, 2024

(65) Prior Publication Data

US 2024/0195244 A1    Jun. 13, 2024

Related U.S. Application Data

(63) Continuation of application No. 17/295,447, filed as application No. PCT/JP2019/044056 on Nov. 11, 2019, now Pat. No. 11,955,844.

(30) Foreign Application Priority Data

Nov. 21, 2018 (JP) ................................ 2018-218067

(51) Int. Cl.
  *H02K 1/27* (2022.01)
  *H02K 1/278* (2022.01)
  (Continued)

(52) U.S. Cl.
  CPC ........... *H02K 1/2791* (2022.01); *H02K 1/278* (2013.01); *H02K 15/03* (2013.01)

(58) Field of Classification Search
  None
  See application file for complete search history.

(56) References Cited

U.S. PATENT DOCUMENTS

| 11,955,844 B2 * | 4/2024 | Ohori ..................... H02K 5/128 |
| 2013/0207503 A1 * | 8/2013 | Morita ................. H02K 1/2706 |
| | | 310/156.66 |

(Continued)

FOREIGN PATENT DOCUMENTS

| CN | 104054237 | 9/2014 |
| CN | 105359382 | 2/2016 |

(Continued)

OTHER PUBLICATIONS

WO-2015005045-A1 Machine Translation (Year: 2015).*
"Office Action of China Counterpart Application", issued on Apr. 19, 2025, with English translation thereof, p. 1-p. 13.

*Primary Examiner* — Oluseye Iwarere
*Assistant Examiner* — Masoud Vaziri
(74) *Attorney, Agent, or Firm* — JCIPRNET

(57) ABSTRACT

A rotor is provided with: a rotor core (32); a plurality of permanent magnets (33); a substantially tubular magnet cover (71); and a load reception block (70). The rotor core (32) rotates integrally with a rotary shaft of a motor. The permanent magnets (33) are arranged on the outer peripheral part of the rotor core (32). The magnet cover (71) covers the exterior of the plurality of permanent magnets (33) and the rotor core (32), and has a flange part which is bent radially inward at the end along a rotation axis. The load reception block (70) is disposed between the flange part and the end surface of the rotor core (32) in a direction along the rotation axis, and abuts against the flange part and the rotor core (32).

9 Claims, 30 Drawing Sheets

(51) Int. Cl.
*H02K 1/2791* (2022.01)
*H02K 15/03* (2006.01)

(56) References Cited

U.S. PATENT DOCUMENTS

| | | | | |
|---|---|---|---|---|
| 2013/0241336 A1* | 9/2013 | Kottmyer | ............. | H02K 1/2791 |
| | | | | 310/156.13 |
| 2014/0102674 A1* | 4/2014 | Manz | ................... | H02K 1/2773 |
| | | | | 29/598 |
| 2015/0061441 A1* | 3/2015 | Figgins | ................ | H02K 1/2773 |
| | | | | 310/156.01 |
| 2016/0149461 A1* | 5/2016 | Kono | ..................... | H02K 5/128 |
| | | | | 310/86 |

FOREIGN PATENT DOCUMENTS

| | | | | |
|---|---|---|---|---|
| JP | 2018026928 | | 2/2018 | |
| WO | WO-2015005045 A1 * | | 1/2015 | ........... H02K 1/2773 |

* cited by examiner

ROTOR, MOTOR, AND METHOD FOR MANUFACTURING ROTOR

CROSS-REFERENCE TO RELATED APPLICATION

This application is a continuation application of and claims the priority benefit of a prior application Ser. No. 17/295,447, filed on May 20, 2021, now allowed. The prior application Ser. No. 17/295,447 is a 371 application of the International PCT application serial no. PCT/JP2019/044056, filed on Nov. 11, 2019, which claims the priority benefits of Japan Patent Application No. 2018-218067, filed on Nov. 21, 2018. The entirety of each of the above-mentioned patent applications is hereby incorporated by reference herein and made a part of this specification.

BACKGROUND

Technical Field

The present invention relates to a rotor, a motor using the rotor, and a method for manufacturing the rotor.

Related Art

As a motor used in a vehicle wiper device or the like, there is a motor in which a rotor having a permanent magnet is arranged radially inside a stator in which a coil is wound. As a method of arranging the permanent magnet of the rotor used in this type of motor, there is a method of arranging the permanent magnet on the outer peripheral part of a rotor core (a surface permanent magnet (SPM)).

In the rotor adopting this method, a plurality of the permanent magnets are assembled on the outer peripheral part of the rotor core, and the exterior of the rotor core and the permanent magnet is covered with a substantially tubular magnet cover in this state. After the rotor core and the permanent magnet are arranged in a substantially tubular peripheral wall of the magnet cover, an end of the magnet cover in an axial direction (a direction along the rotation axis) is fixed to an end of the rotor core.

As a way of fixing the end of the magnet cover in the axial direction, a way in which a bent piece is arranged in advance on the end edge of the magnet cover and the bent piece is bent to be locked in a hole or a concavity in the end surface of the rotor core (for example, see Patent literature 1), a way of fixing by caulking, and the like are known.

[Literature of related art]

PATENT LITERATURE

Patent literature 1: Japanese Patent Laid-Open No. 2008-295140

SUMMARY

Problems to be Solved

In a rotor in which a bent piece is arranged on the end edge of the magnet cover and the bent piece is locked in a hole or a concavity in the end surface of the rotor core, although the work of assembling the magnet cover with respect to the rotor core and the permanent magnet is easy, assembly strength is inferior to that of fixing by caulking.

However, in the rotor in which the magnet cover is fixed to the rotor core by caulking, when the end edge of the magnet cover is caulked, a large caulking load is easily transmitted to the permanent magnet. Besides, if the large caulking load is transmitted to the permanent magnet through a caulking part of the magnet cover during the caulking work, there is concern that damage or degradation occurs in the permanent magnet.

An objective of the present invention is to provide a rotor, a motor, and a method for manufacturing the rotor, which can prevent damage or deterioration of a permanent magnet caused by the caulking of a magnet cover from occurring.

Means to Solve Problems

A rotor according to the present invention adopts the following configuration in order to solve the above problems.

That is, the rotor according to the present invention is a rotor that rotates by receiving a magnetic field of a stator, and includes: a rotor core that rotates integrally with a rotary shaft of a motor; a plurality of permanent magnets arranged on the outer peripheral part of the rotor core; a substantially tubular magnet cover that covers the exterior of the rotor core and a plurality of the permanent magnets, and has a flange part which is bent radially inward at the end in a direction along a rotation axis; and a load reception block that is disposed between the flange part and the end surface of the rotor core in the direction along the rotation axis, and abuts against the flange part and the rotor core.

With the above configuration, the rotor core and the plurality of permanent magnets are arranged inside the magnet cover together with the load reception block, and are fixed to the magnet cover by caulking the flange part of the magnet cover. When the flange part is caulked, a large load acts on the flange part and members inside the flange part, but because the load reception block is disposed between the flange part and the end surface of the rotor core in the direction along the rotation axis, a caulking load is less likely to act on the permanent magnet.

At least the end on one side of the permanent magnet in the direction along the rotation axis may protrude outward from the end of the rotor core on the same side in the direction along the rotation axis, and an abutting part of the load reception block with the flange part may be arranged at a position more outside than the end of the permanent magnet in the direction along the rotation axis.

In this case, because the abutting part of the load reception block with the flange part is arranged at a position outside the end of the permanent magnet in the direction along the rotation axis, the caulking load is less likely to act directly on the permanent magnet. Thus, when this configuration is adopted, a length of the permanent magnet can be sufficiently secured, and the damage or deterioration of the permanent magnet caused by caulking can be advantageously prevented.

The rotor core may have a substantially cylindrical core main body part, and a plurality of salient poles protruding in a radial direction from the outer peripheral surface of the core main body part. The plurality of the permanent magnets may be disposed between the plurality of adjacent salient poles and abut against the salient poles. The load reception block may have an annular part that is arranged to overlap the end surface of the core main body part in the direction along the rotation axis, and a plurality of legs that are arranged to protrude in the radial direction from the outer peripheral surface of the annular part and overlap the end surface of each of the salient poles in the direction along the rotation axis.

In this case, because the load reception block is equipped with the annular part arranged to overlap the end surface of the core main body part of the rotor core and the legs arranged to overlap the end surface of the salient pole of the rotor core, an end of the permanent magnet having a long length in the direction along the rotation axis can be arranged in a space surrounded by a pair of adjacent legs and the outer peripheral surface of the annular part. Thus, when this configuration is adopted, the length of the permanent magnet can be sufficiently secured, and the input of the caulking load to the end of the permanent magnet can be suppressed more advantageously.

The legs of the load reception block desirably extend to a more outer position in the radial direction centered on the rotation axis than an abutting region of the salient poles of the rotor core with the permanent magnet.

In this case, the caulking load is less likely to be input to the vicinity of a support region (the abutting region of the leg) by the leg in the permanent magnet, and the damage or deterioration of the permanent magnet caused by the caulking load can be advantageously prevented.

The load reception block may have a core regulation part that engages with the rotor core and regulates a displacement of the rotor core in the peripheral direction centered on the rotation axis.

In this case, because the displacement of the rotor core in the peripheral direction with respect to the load reception block can be regulated by the core regulation part, a position relationship between the load reception block and the rotor core in the peripheral direction can be accurately set.

The core regulation part may be configured by a locking claw that is arranged in a protruding state from the annular part in the direction along the rotation axis and is locked to an engagement part on the inner periphery of the core main body part. In this case, because the locking claw which is the core regulation part is locked to the engagement part on the inner periphery of the core main body part, when the caulking load acts radially inward from the outer peripheral side of the load reception block, the locking claw displaces radially inward, and thereby an excessive stress is not concentrated on the locking claw. Thus, when this configuration is adopted, the locking claw (the core regulation part) can be prevented from being damaged due to the input of the caulking load.

A bulging part that abuts against the core main body part in the direction along the rotation axis may be arranged in the vicinity of the region on the inner peripheral surface of the annular part where the locking claw is arranged in a protruding state. In this case, because the vicinity of the locking claw on the inner peripheral surface of the annular part is reinforced by the bulging part, a large load generated when the rotary shaft is press-fitted into the inner peripheral surface of the rotor core can be received by the bulging part. Thus, when this configuration is adopted, the position deviation of the rotor core in the axial direction can be prevented when the rotary shaft is press-fitted into the rotor core.

A first magnet regulating part that abuts against the permanent magnet in the direction along the rotation axis and regulates a displacement of the permanent magnet in the direction along the rotation axis may be arranged in an outer peripheral edge of the annular part.

In this case, the position deviation of the permanent magnet in the direction along the rotation axis can be regulated by the first magnet regulating part on the outer periphery of the annular part.

A second magnet regulating part that abuts against the permanent magnet in the peripheral direction centered on the rotation axis and regulates a displacement of the permanent magnet in the peripheral direction may be arranged in the leg.

In this case, the position deviation of the permanent magnet in the peripheral direction can be regulated by the second magnet regulating part of the leg.

The load reception block may have a magnet position detecting protrusion that protrudes to the outside of the magnet cover.

In this case, after the rotor core, the permanent magnet, and the load reception block are assembled in the magnet cover, the position of the permanent magnet in the magnet cover can be accurately detected using the magnet position detecting protrusion. Thus, the permanent magnet in the magnet cover can be magnetized accurately.

In addition, a motor according to the present invention adopts the following configuration in order to solve the above problems.

That is, the motor according to the present invention includes any of the above rotors, and a stator that is arranged on the outer peripheral side of the rotor and generates a magnetic field.

In addition, a method for manufacturing a rotor according to the present invention adopts the following configuration in order to solve the above problems. That is, the method for manufacturing a rotor according to the present invention is a method for manufacturing a rotor that rotates by receiving a magnetic field of a stator, and includes: a step of arranging a plurality of permanent magnets on the outer peripheral part of the rotor core and arranging a load reception block on the end surface of the rotor core in a rotation axis direction; a step of arranging a substantially tubular magnet cover on the exterior of the rotor core, a plurality of the permanent magnets, and the load reception block; and a step of caulking an end edge of the magnet cover in the rotation axis direction radially inward and bringing a caulking part of the magnet cover into contact with the end surface of the load reception block.

[Effect]

According to the present invention, because the load reception block is disposed between the flange part and the end surface of the rotor core in the direction along the rotation axis, the damage or deterioration of the permanent magnet caused by the caulking of the magnet cover can be prevented from occurring.

DESCRIPTION OF THE EMBODIMENTS

Hereinafter, an embodiment of the present invention is described with reference to the drawings. Moreover, in each of embodiments or modification examples described below, the same parts are designated by a common reference sign, and duplicate description is omitted.

(Motor Unit)

Figure 1:
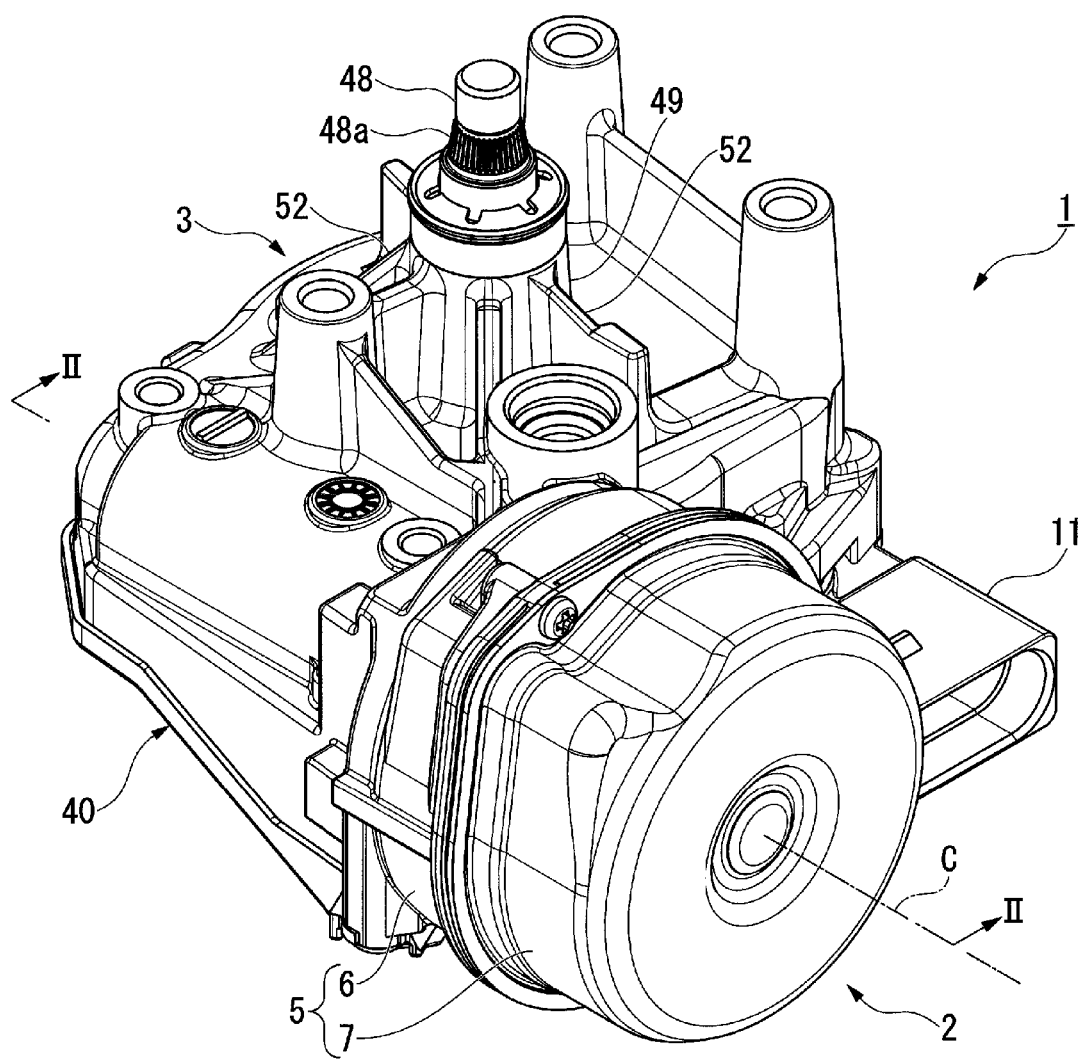
FIG. 1 is a perspective view of a motor unit of an embodiment.
Figure 2:
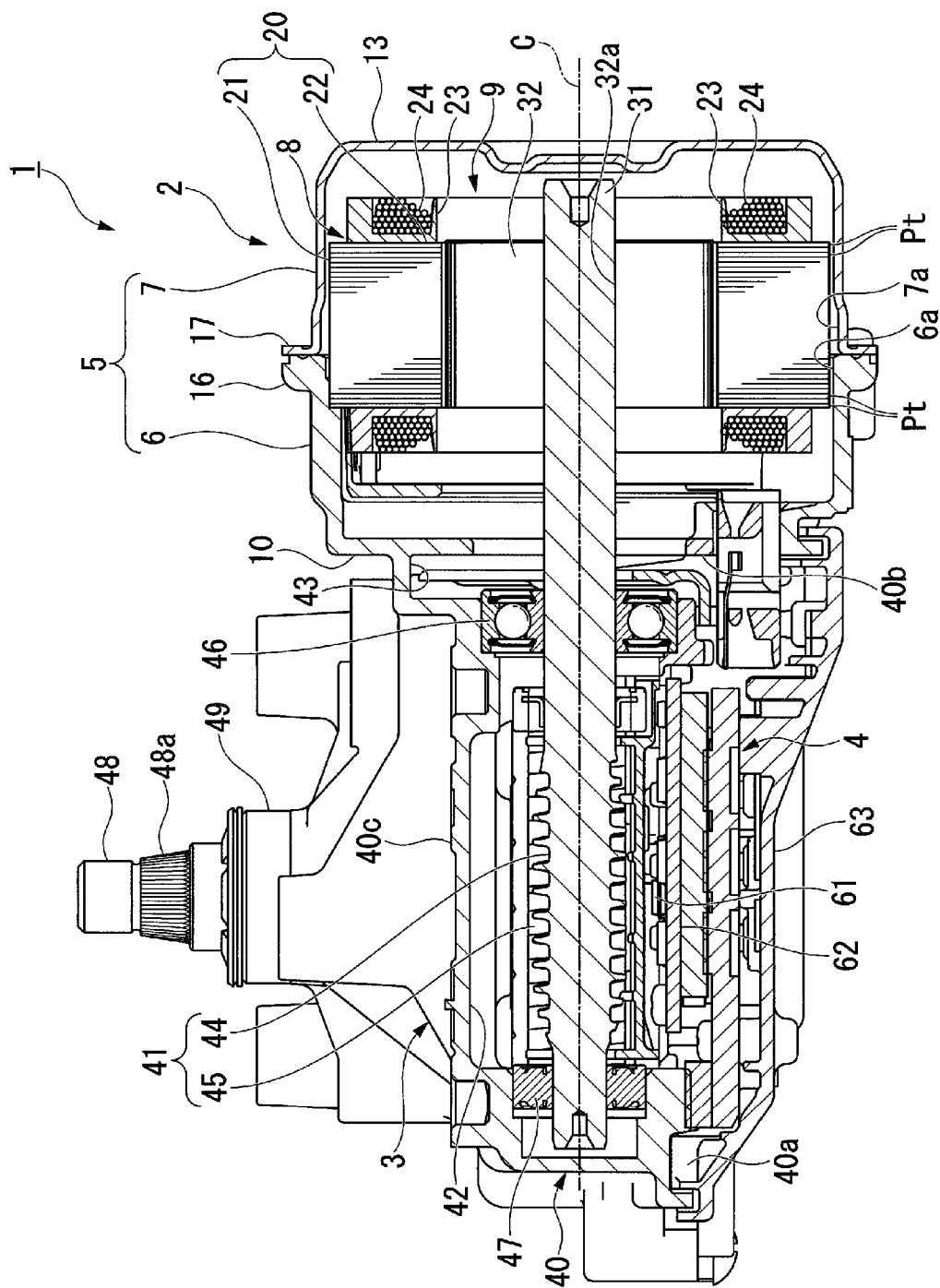
FIG. 2 is a cross-sectional view of the motor unit of the embodiment along a II-II line in FIG. 1.

FIG. 1 is a perspective view of a motor unit 1 used in a vehicle. FIG. 2 is a cross-sectional view of the motor unit 1 along a II-II line in FIG. 1.

The motor unit 1 is used as, for example, a drive source for a vehicle wiper device. As shown in FIG. 1 and FIG. 2, the motor unit 1 includes a motor 2, a deceleration part 3 that decelerates and outputs rotation of the motor 2, and a controller 4 that controls drive of the motor 2.

Moreover, in the following description, a term "axial direction" refers to a direction along a rotation axis of a rotary shaft 31 of the motor 2, and a term "peripheral direction" refers to a peripheral direction of the rotary shaft 31. In addition, a term "radial direction" refers to a radial direction of the rotary shaft 31.

(Motor)

The motor 2 includes a motor case 5, a substantially cylindrical stator 8 housed in the motor case 5, and a rotor 9 arranged radially inside the stator 8 and arranged rotatably with respect to the stator 8. The motor 2 of the embodiment is a so-called brushless motor that requires no brush when electric power is supplied to the stator 8.

(Motor Case)

The motor case 5 is formed by a material having excellent heat dissipation such as an aluminum alloy or the like. The motor case 5 includes a first motor case 6 and a second motor case 7 that are configured to be separable in the axial direction. The first motor case 6 and the second motor case 7 are respectively formed in a bottomed cylindrical shape.

The first motor case 6 is integrally molded with a gear case 40 in a manner that a bottom part 10 is connected to this gear case 40 of the deceleration part 3. A through-hole through which the rotary shaft 31 of the motor 2 can be inserted is formed at substantially the center of the bottom part 10 in the radial direction.

In addition, outer flange parts 16 and 17 protruding radially outward are respectively formed in opening parts 6a and 7a of the first motor case 6 and the second motor case 7. The motor case 5 has an internal space formed by abutting the outer flange parts 16 and 17 against each other. The stator 8 and the rotor 9 are arranged in the internal space of the motor case 5. The stator 8 is fixed to the inner peripheral surface of the motor case 5.

(Stator)

The stator 8 includes a stator core 20 made of a laminated electromagnetic steel plate and the like, and a plurality of coils 24 wound around the stator core 20. The stator core 20 has an annular core main body part 21 and a plurality of (for example, six) teeth 22 protruding radially inward from the inner peripheral part of the core main body part 21.

The inner peripheral surface of the core main body part 21 and each tooth 22 are covered with a resin insulator 23. The coil 24 is wound around a corresponding predetermined tooth 22 from the above of the insulator 23. Each coil 24 generates a magnetic field for rotating the rotor 9 by electric power supplied from the controller 4.

(Rotor)

The rotor 9 is rotatably arranged radially inside the stator 8 via a minute gap. The rotor 9 includes a substantially tubular rotor core 32 in which the rotary shaft 31 is press-fitted and fixed to the inner peripheral part, and four permanent magnets 33 (see FIGS. 5 to 7) assembled on the outer peripheral part of the rotor core 32. In the embodiment, the rotary shaft 31 is integrally formed with a worm shaft 44 constituting the deceleration part 3. The rotary shaft 31 and the worm shaft 44 are rotatably supported by the motor case 5 and the gear case 40. The rotary shaft 31 and the worm shaft 44 rotate around the rotation axis (axis center C). Moreover, as the permanent magnet 33, for example, a ferrite magnet is used. However, the permanent magnet 33 is not limited hereto, and a neodymium bond magnet, a neodymium sintered magnet, or the like can also be applied. The detailed structure of the rotor 9 is described later.

(Deceleration Part)

The deceleration part 3 includes the gear case 40 integrated with the motor case 5, and a worm deceleration mechanism 41 housed in the gear case 40. The gear case 40 is formed by a metal material having excellent heat dissipation such as an aluminum alloy or the like. The gear case 40 is formed in a box shape having an opening part 40a on one surface. The gear case 40 has a gear accommodating part 42 that accommodates the worm deceleration mechanism 41 therein. In addition, an opening part 43 for communicating the through-hole of the first motor case 6 and the gear accommodating part 42 is formed at a location where the first motor case 6 is integrally formed on a side wall 40b of the gear case 40.

A substantially cylindrical bearing boss 49 is arranged in a protruding state on a bottom wall 40c of the gear case 40. The bearing boss 49 is used for rotatably supporting an output shaft 48 of the worm deceleration mechanism 41, and a slide bearing (not shown) is arranged on the inner peripheral side. An O-ring (not shown) is mounted inside a front end of the bearing boss 49. In addition, a plurality of ribs 52 for ensuring rigidity are arranged in a protruding state on the outer peripheral surface of the bearing boss 49.

The worm deceleration mechanism 41 accommodated in the gear accommodating part 42 is configured by the worm shaft 44 and a worm wheel 45 meshed with the worm shaft 44. Both ends of the worm shaft 44 in the axial direction are rotatably supported by the gear case 40 via bearings 46 and 47. The output shaft 48 of the motor 2 is coaxially and integrally arranged on the worm wheel 45. The worm wheel 45 and the output shaft 48 are arranged in a manner that rotation axes thereof are substantially orthogonal to the rotation axis (the axis center C) of the worm shaft 44 (the rotary shaft 31 of the motor 2). The output shaft 48 protrudes to the outside via the bearing boss 49 of the gear case 40. A spline 48a that can be connected to a subject to be driven by a motor is formed at the protruding front end of the output shaft 48.

In addition, a sensor magnet (not shown) is arranged on the worm wheel 45. A position of the sensor magnet is detected by a magnetic detection element 61 arranged on the controller 4 described later. That is, a rotation position of the worm wheel 45 is detected by the magnetic detection element 61 of the controller 4.

(Controller)

The controller 4 has a controller board 62 on which the magnetic detection element 61 is mounted. The controller board 62 is arranged in the opening part 40a of the gear case 40 in a manner that the magnetic detection element 61 faces the sensor magnet of the worm wheel 45. The opening part 40a of the gear case 40 is closed by a cover 63.

Terminal parts of the plurality of coils 24 drawn from the stator core 20 are connected to the controller board 62. In addition, terminals of a connector 11(see FIG. 1) arranged on the cover 63 are electrically connected to the controller board 62. In addition to the magnetic detection element 61, a power module (not shown) including a switching element such as a field effect transistor (FET) that controls a drive voltage supplied to the coil 24 or the like, a capacitor (not shown) for smoothing the voltage, and the like are mounted on the controller board 62.

Detailed Structure of Rotor of First Embodiment

Figure 3:
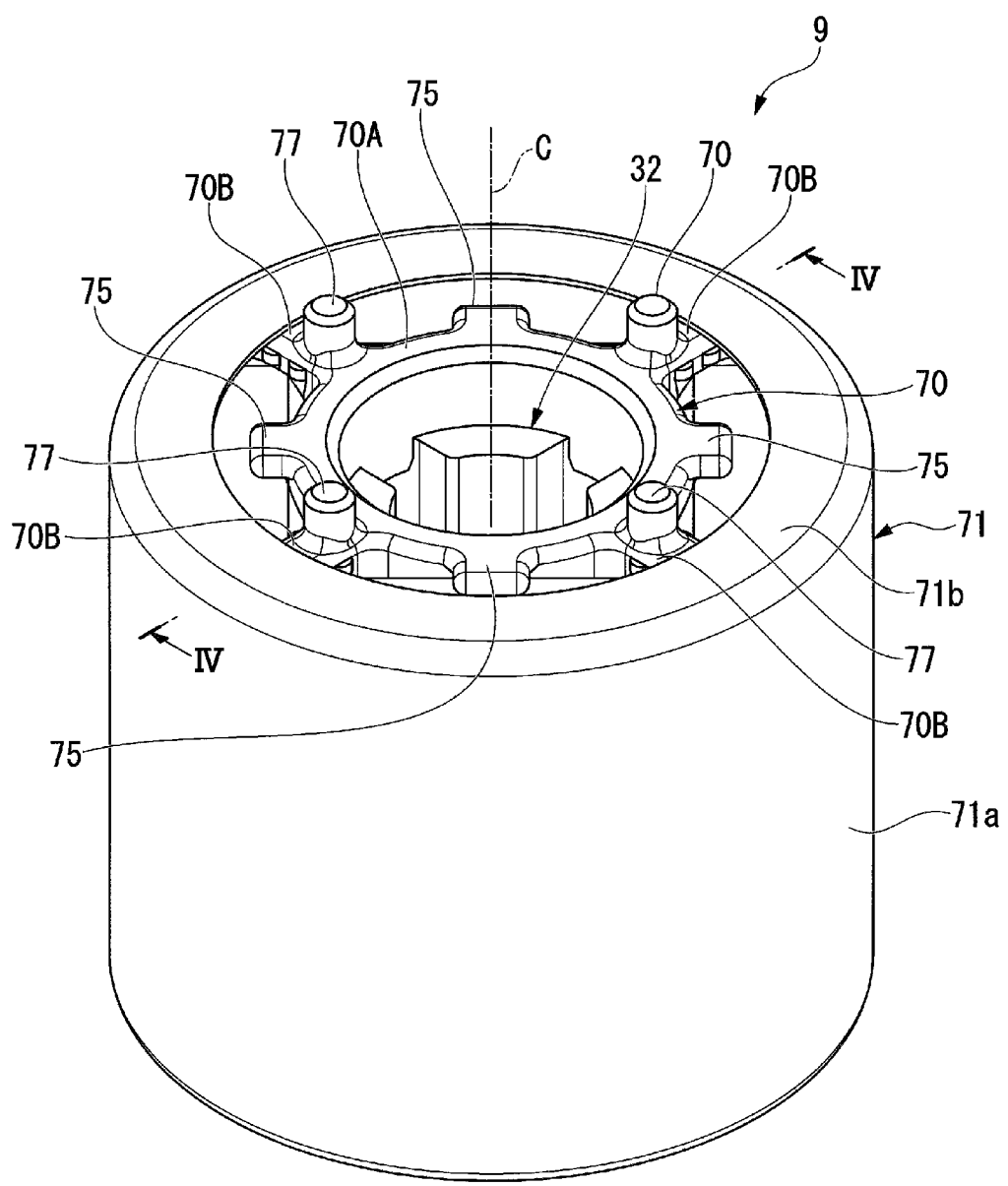
FIG. 3 is a perspective view of a rotor of a first embodiment.
Figure 4:
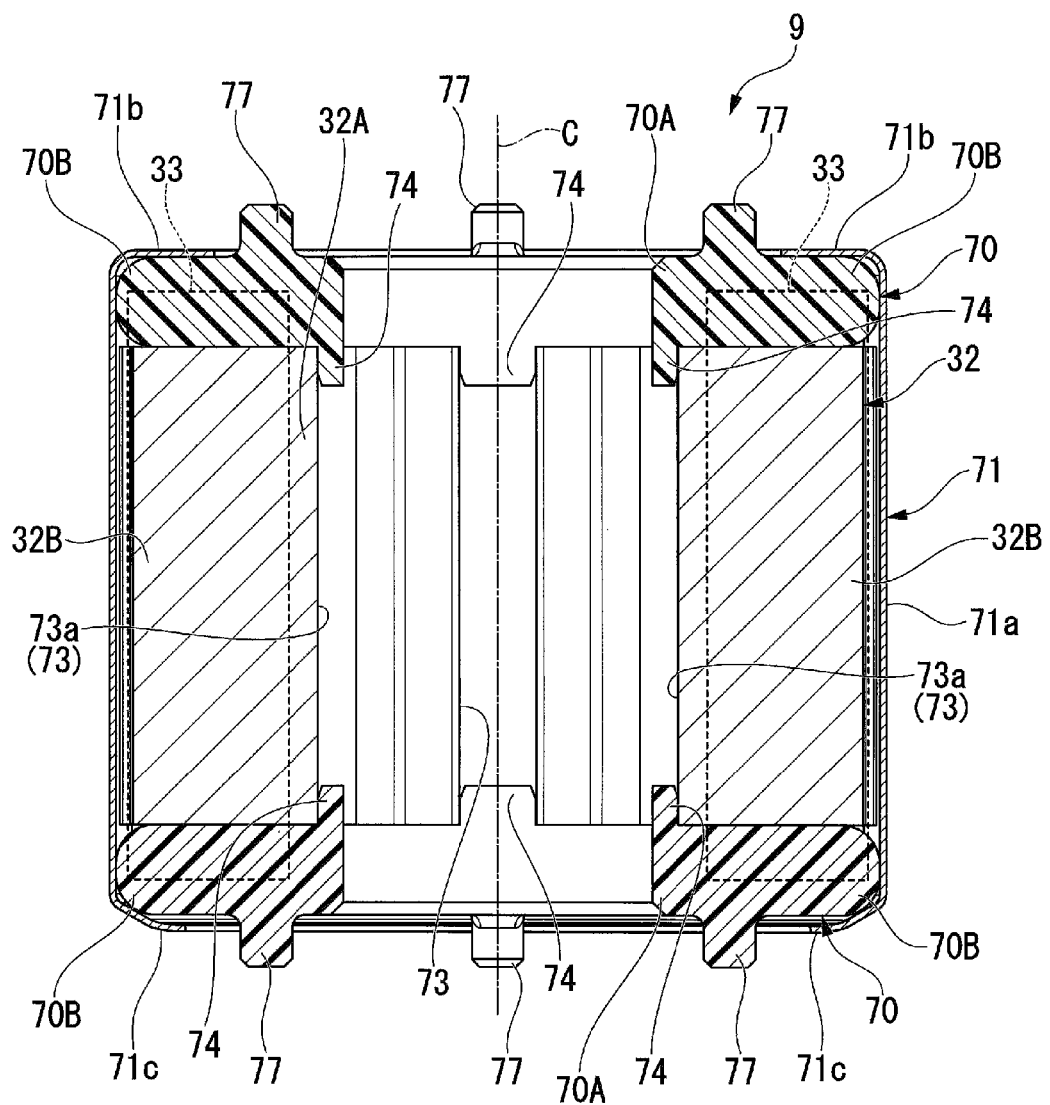
FIG. 4 is a cross-sectional view of the rotor of the first embodiment along a IV-IV line in FIG. 3.
Figure 5:
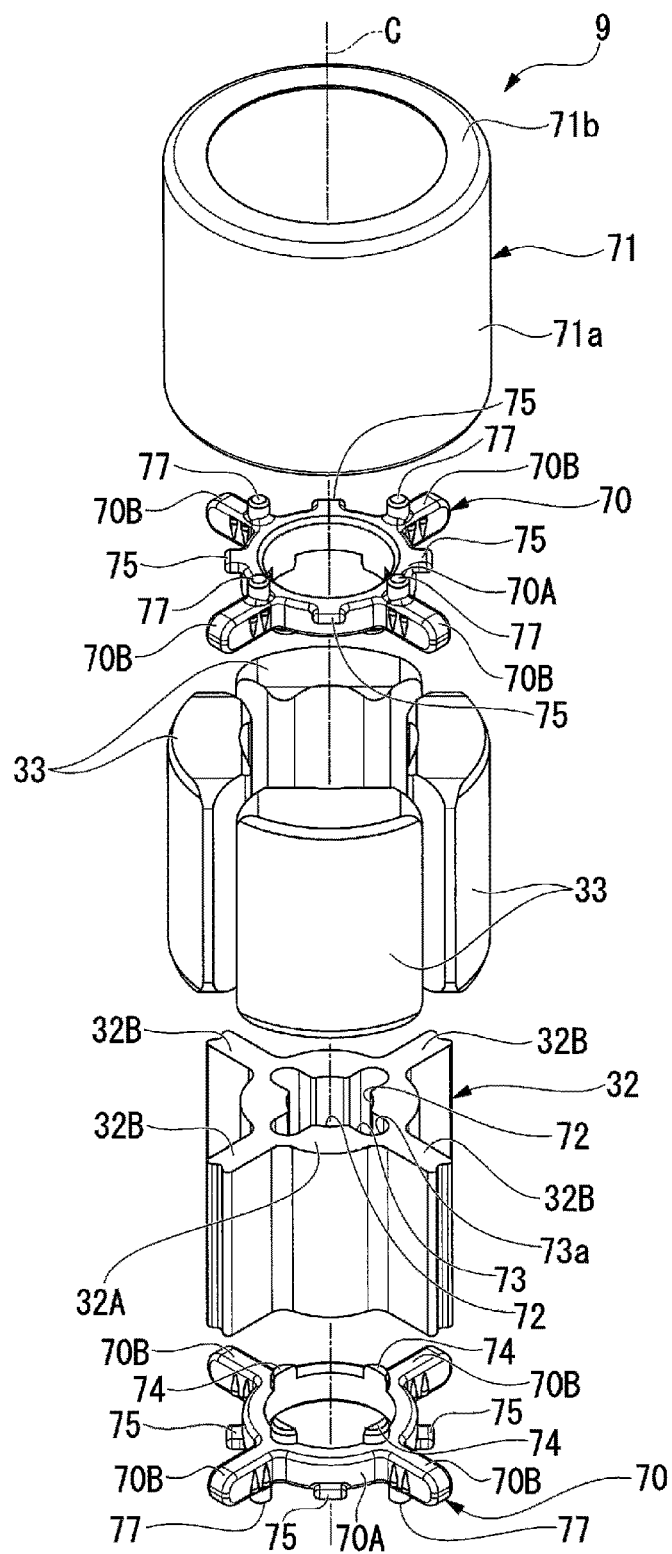
FIG. 5 is an exploded perspective view of the rotor of the first embodiment.

FIG. 3 is a perspective view of the rotor 9 of first embodiment, and FIG. 4 is a cross-sectional view taken along a IV-IV line in FIG. 1. In addition, FIG. 5 is an exploded perspective view of the rotor 9.

As shown in these drawings, the rotor 9 includes: the rotor core 32 that can rotate around the rotation axis (the axis center C) together with the rotary shaft 31 (see FIG. 2); the four permanent magnets 33 arranged on the outer peripheral part of the rotor core 32; a pair of load reception blocks 70 respectively arranged on one end side and the other end side of the rotor core 32 in the axial direction; and a metal magnet cover 71 that covers the rotor core 32 and the permanent magnet 33 from the outside in the axial direction and the radial direction together with the pair of load reception blocks 70.

Figure 6:
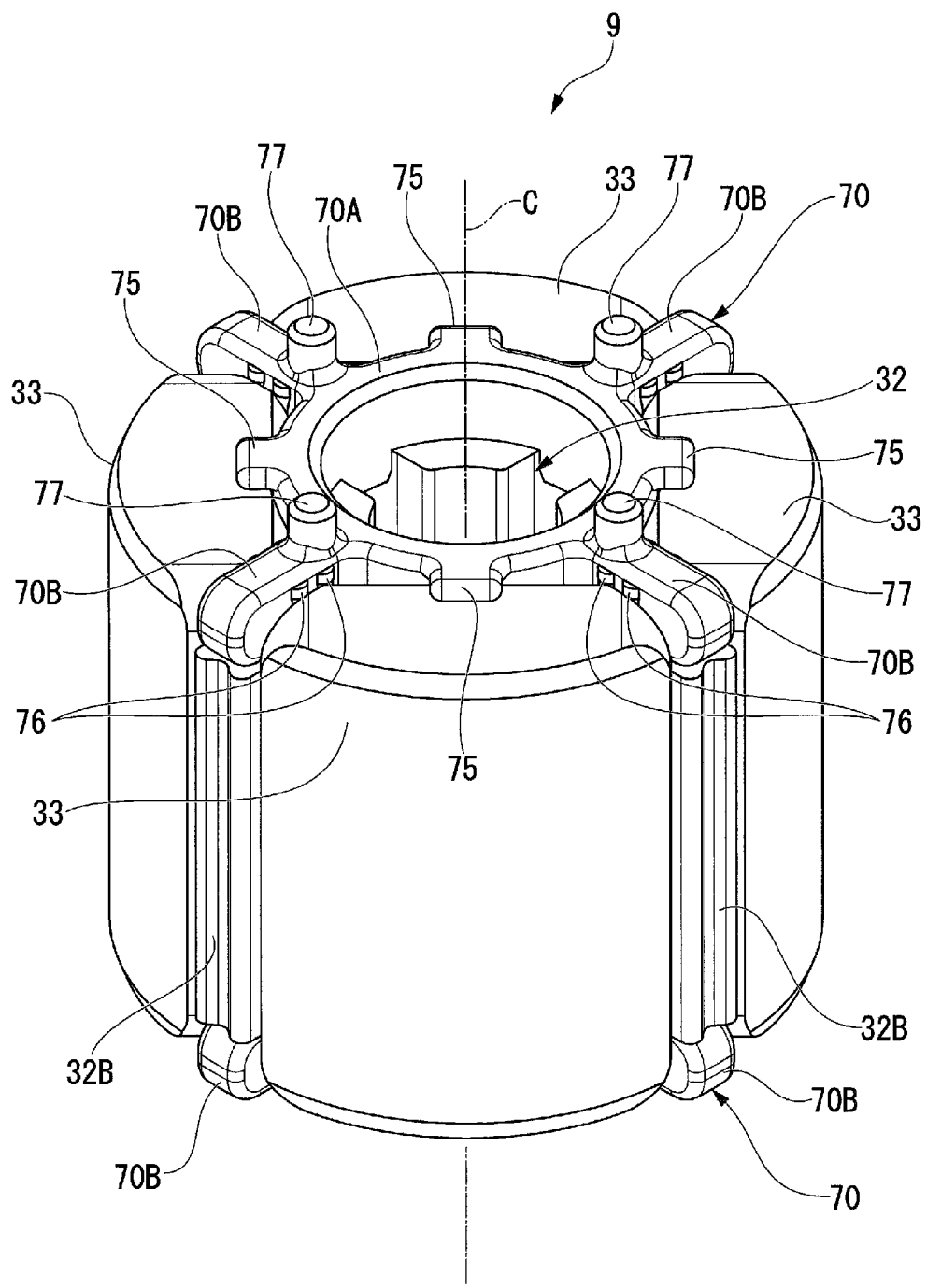
FIG. 6 is a perspective view of the rotor of the first embodiment with a magnet cover removed.
Figure 7:
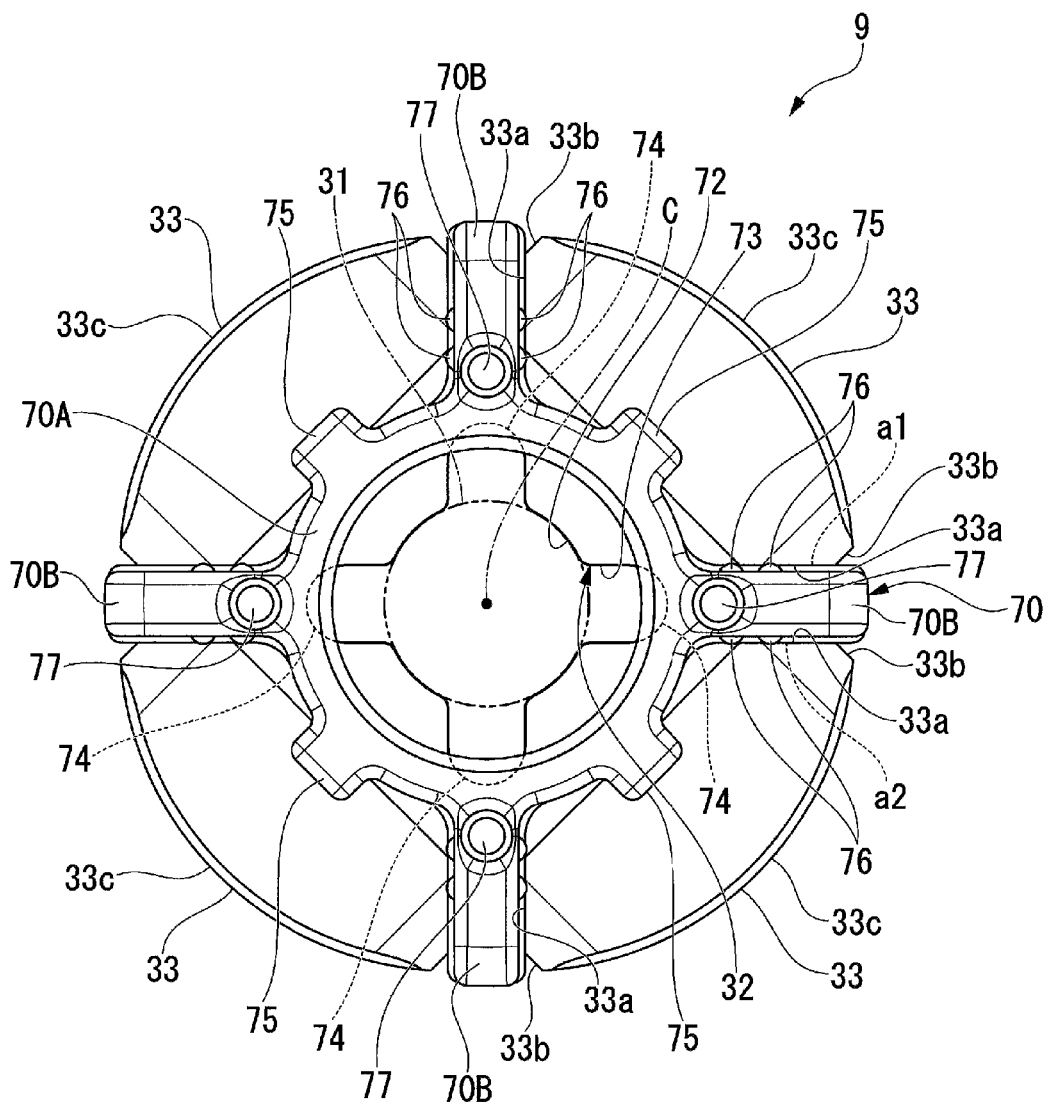
FIG. 7 is a plan view of the rotor of the first embodiment with the magnet cover removed.
Figure 8:
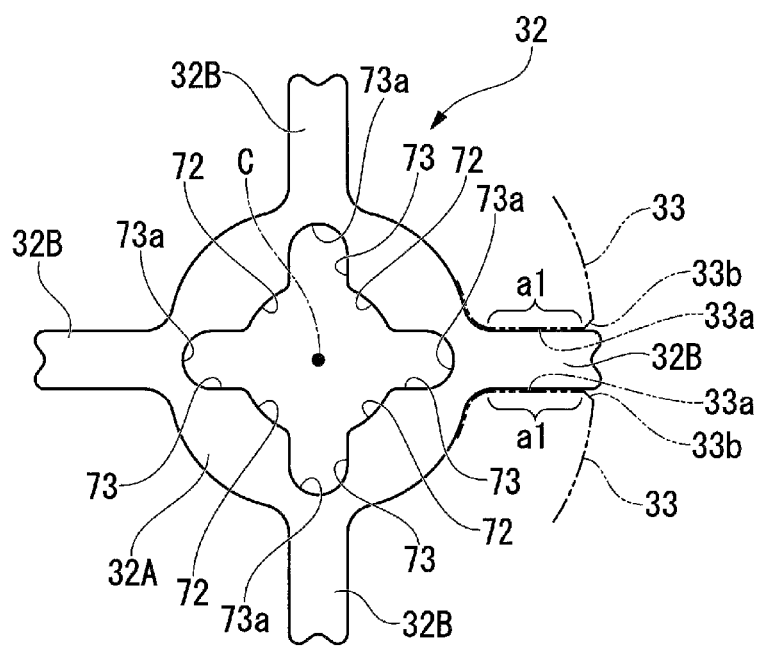
FIG. 8 is a plan view of a rotor core of the first embodiment.

FIG. 6 is a perspective view of the rotor 9 with the magnet cover 71 removed, and FIG. 7 is a plan view of the rotor 9 with the magnet cover 71 removed. In addition, FIG. 8 is a plan view of the rotor core 32.

The rotor core 32 has a substantially cylindrical core main body part 32A, and four salient poles 32B protruding in a radial direction from the outer peripheral surface of the core main body part 32A. The rotor core 32 is formed by, for example, pressure-molding soft magnetic powder or laminating a plurality of electromagnetic steel sheets in the axial direction.

The four salient poles 32B protrude at equal intervals on the outer periphery of the core main body part 32A, and protruding parts of the four salient poles 32B extend in the axial direction. In the embodiment, the outer peripheral surface of the core main body part 32A is formed in a substantially circular shape centered on the axis center C (the rotation axis) of the rotor 9. The side surface of each of salient poles 32B facing the circumferential direction of the rotor core 32 is formed by a flat surface. The permanent magnet 33 is assembled between salient poles 32B adjacent to each other in the circumferential direction of the rotor core 32.

In the embodiment, the permanent magnet 33 is formed in a substantially arcuate shape in the axial view. However, although the inner peripheral side of the permanent magnet 33 is formed in a substantially arcuate shape (a substantially arcuate shape that almost matches the outer peripheral surface of the core main body part 32A) centered on the axis center C (the rotation axis) of the rotor 9, the outer peripheral side of the permanent magnet 33 is formed in an arcuate shape having a smaller radius of curvature than the inner peripheral side. Each of the salient poles 32B of the rotor core 32 is formed in a manner that a distance from the axis center C (the rotation axis) of the rotor 9 to an outer end in the radial direction is almost the same as a distance from the axis center C (the rotation axis) of the rotor 9 to a maximum bulging part 33c (see FIG. 7) on the outer peripheral surface of the permanent magnet 33.

As shown in FIG. 4, a length of each permanent magnet 33 in the axial direction is formed to be longer than a length of the salient pole 32B of the rotor core 32 in the axial direction. In the case of the embodiment, each permanent magnet 33 is set in a manner of protruding by almost the same length from one end side and the other end side in the axial direction with respect to the salient pole 32B in a state of being assembled to the rotor core 32.

As shown in FIG. 7, an abutting surface 33a capable of abutting against the flat side surface of the salient pole 32B, and an inclined surface 33b extending diagonally in a direction away from the salient pole 32B from an outer end of the abutting surface 33a in the radial direction are arranged at both ends of the permanent magnet 33 in the arcuate direction.

In addition, as shown in FIG. 8, four arcuate surfaces 72 centered on the axis center C (the rotation axis) of the rotor 9, and relief grooves 73 extending radially outward from between adjacent arcuate surfaces 72 are formed in the inner peripheral surface of the rotor core 32. Each relief groove 73 extends radially outward by the same length, and the end in the extending direction is set as an arcuate engagement part 73a. A locking claw 74 (a core regulation part) described later of the load reception block 70 is fitted into the engagement part 73a of each relief groove 73. In addition, the rotary shaft 31 of the motor 2 is press-fitted and fixed to four arcuate surfaces on the inner periphery of the rotor core 32.

The magnet cover 71 has a cylindrical peripheral wall 71a, and a pair of flange parts 71b and 71c respectively extending in a bent state radially inward from one end and the other end of the peripheral wall 71a in the axial direction. The rotor core 32 and the permanent magnet 33 are arranged inside the peripheral wall 71a together with the pair of load reception blocks 70. At least one of the pair of flange parts 71b and 71c is a caulking flange that is plastically deformed by caulking in a state where the rotor core 32 and the permanent magnet 33 are arranged inside the peripheral wall 71a together with the pair of load reception blocks 70. In the following description, one flange part 71b is formed by bending in advance, and the other flange part 71c is formed by caulking after the loading of the rotor core 32 and the like.

Figure 9:
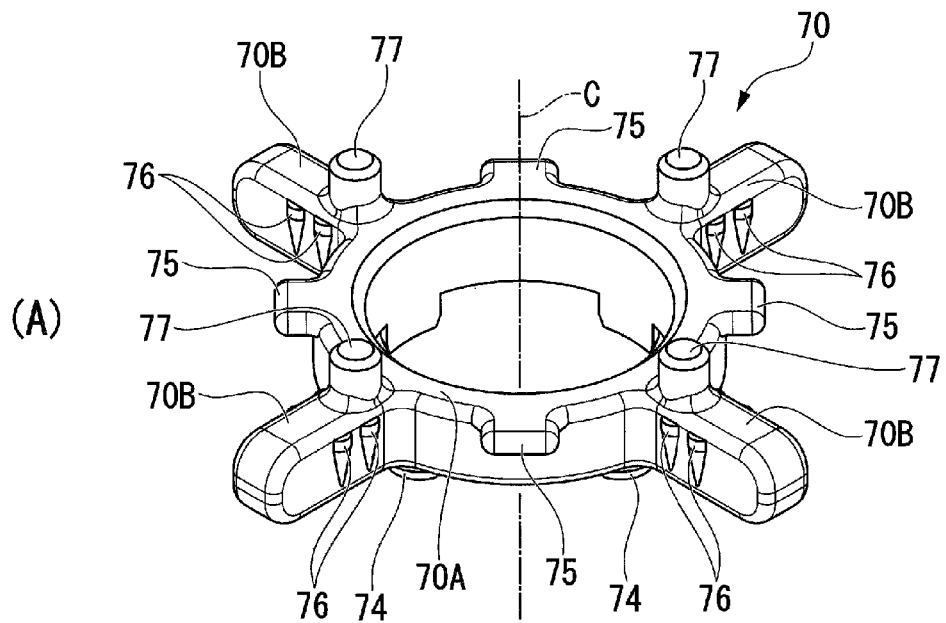
FIG. 9 shows perspective views of a load reception block of the first embodiment.
Figure 9:
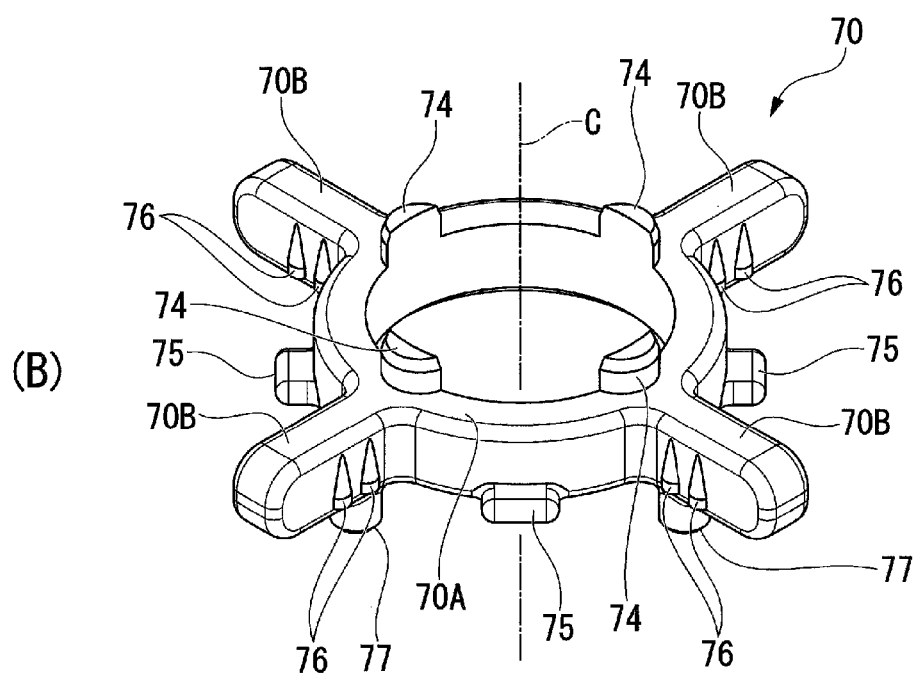

FIG. 9 shows perspective views of the load reception block 70. FIG. 9(A) is a view of the load reception block 70 viewed from one end side in the axial direction, and FIG. 9(B) is a view of the load reception block 70 viewed from the other end side in the axial direction. In FIG. 4 and FIG. 5, each load reception block 70 arranged on the upper side and the lower side of the rotor core 32 has the same shape, and both load reception blocks are assembled to the rotor core 32 in a state of being turned upside down.

The load reception block 70 has an annular part 70A arranged to overlap the end surface of the core main body part 32A of the rotor core 32 in the axial direction, and four legs 70B that are arranged to protrude in the radial direction from the outer peripheral surface of the annular part 70A and overlap the end surfaces of the salient poles 32B of the rotor core 32 in the axial direction. The four legs 70B protrude at equal intervals on the outer periphery of the annular part 70A. The load reception block 70 is formed by, for example, a hard resin. The load reception block 70 is formed in a shape almost overlapping with the rotor core 32 in the axial view.

Each load reception block 70 is arranged to overlap the end surface of the rotor core 32 in the axial direction, and a part of an outer region in the radial direction is disposed between the end surface of the rotor core 32 and the flange parts 71b and 71c of the magnet cover 71. In the embodiment, the flange part 71c on the lower side in FIG. 4 serves as a caulking flange, and during the caulking work of the flange part 71c, a caulking load is received by the leg 70B of the load reception block 70 below through the flange part 71c.

A thickness of each leg 70B of the load reception block 70 in the axial direction is set to be thicker than the protruding length of the permanent magnet 33 from the salient pole 32B of the rotor core 32. Thus, in the axial direction, the abutting part of the load reception block 70 with the flange part 71c (the caulking flange) is arranged at a position outside the axial end of the permanent magnet 33 in the axial direction. In addition, in the case of the embodiment, in the radial direction, each leg 70B extends to a position in the radial direction equal to the end of the corresponding salient pole 32B of the rotor core 32 in the radial direction.

Moreover, the leg 70B is not required to extend to a position in the radial direction equal to the end of the corresponding salient pole 32B of the rotor core 32 in the radial direction, but the leg 70B is desired to at least extend to an outer position in the radial direction from an abutting region a1 (a region in contact with the abutting surface 33a) of the salient pole 32B with the permanent magnet 33.

The locking claw 74 protruding toward the rotor core 32 side substantially along the axial direction is integrally formed at an extension upper position of each leg 70B on the inner peripheral edge of the annular part 70A of the load reception block 70. A cross section of the locking claw 74 is formed in a substantially semi-circular shape, and when the load reception block 70 is assembled to the end surface of the rotor core 32, the locking claw 74 is fitted into the relief groove 73 (the engagement part 73a) in the inner periphery of the rotor core 32. The relative displacement of the load reception block 70 in the radial direction with respect to the rotor core 32 is regulated by fitting each locking claw 74 into the corresponding relief groove 73 (the engagement part 73a).

A magnet regulating piece 75 (a first magnet regulating part) that regulates the displacement of each permanent magnet 33 in the axial direction is arranged in a protruding state radially outward at a substantially intermediate position of each adjacent leg 70B on the outer peripheral edge of the annular part 70A of the load reception block 70. The magnet regulating piece 75 is formed to be thinner than the thickness of the annular part 70A in the axial direction, and protrudes radially outward from a position in the annular part 70A that is biased axially outward. The end of the permanent magnet 33 in the axial direction assembled between the salient poles 32B of the rotor core 32 can be brought into contact with the magnet regulating piece 75.

In addition, a pair of press fit protrusions 76 (second magnet regulating parts) is formed on the side surface near the base of each leg 70B of the load reception block 70. Each press fit protrusion 76 is formed in a manner that the press fit protrusion 76 extends along the axial direction and a bulging height gradually decreases toward the side closer to the rotor core 32.

When the load reception block 70 is assembled to the rotor core 32 in which the permanent magnet 33 is arranged on the outer peripheral part, the end of each permanent magnet 33 is inserted to be disposed between the adjacent legs 70B of the load reception block 70. At this time, the abutting surface 33a of the permanent magnet 33 abuts against the press fit protrusion 76. Thereby, the displacement of the permanent magnet 33 in the peripheral direction is regulated.

Furthermore, a substantially columnar magnet position detecting protrusion 77 is formed along the axial direction on the end surface in the axial direction (the end surface opposite to the protruding side of the locking claw 74) near the base of each leg 70B of the load reception block 70. In addition, the magnet position detecting protrusion 77 protrudes to the outside of the magnet cover 71 on the inner peripheral part of the flange part 71c.

In the rotor 9 of the embodiment, after the rotor core 32, the permanent magnet 33, and the load reception block 70 are assembled in the magnet cover 71, the permanent magnet 33 in the magnet cover 71 is magnetized. The magnet position detecting protrusion 77 is used to detect the position of the permanent magnet 33 in the magnet cover 71 at the time of this magnetism.

(Assembly of Rotor)

When the rotor 9 is assembled, first, the permanent magnet 33 is arranged on the outer peripheral part of the rotor core 32, the load reception block 70 is temporarily assembled on each end surface of the rotor core 32 in the axial direction in this state, and the assembly thereof is inserted into the magnet cover 71 in this state. At this time, one flange part 71b of the magnet cover 71 is formed in a state of bending in advance. Next, the other end edge of the magnet cover 71 in the axial direction is caulked from this state to form the flange part 71c (the caulking flange) by plastic deformation, and the flange part 71c is pressed against the end surface of each leg 70B of the load reception block 70. As a result, the rotor core 32 and the permanent magnet 33 are fixed to the inside of the magnet cover 71 together with the load reception block 70.

As described above, in the rotor 9 of the embodiment, the load reception block 70 is disposed between the end surface of the rotor core 32 in the axial direction and the flange part 71c (the caulking flange) of the magnet cover 71, and the load reception block 70 abuts against the flange part 71c and the rotor core 32. Therefore, when the flange part 71c is caulked, the caulking load at that time can be received by the load reception block 70. As a result, the caulking load does not act directly on the permanent magnet 33 in the magnet cover 71, and the damage or deterioration of the permanent magnet 33 can be prevented from occurring.

In addition, in the rotor 9 of the embodiment, the end of the permanent magnet 33 in the axial direction protrudes outward from the end of the rotor core 32 in the axial direction, and the abutting part of the load reception block 70 with the flange part 71c (the caulking flange) is arranged at a position outside the end of the permanent magnet 33. Therefore, in the rotor 9 of the embodiment, the length of the permanent magnet 33 can be sufficiently secured, and the damage or deterioration of the permanent magnet 33 caused by caulking can be advantageously prevented by the load reception block 70.

Particularly, in the rotor 9 of the embodiment, the rotor core 32 has the core main body part 32A having a substantially cylindrical shape and the plurality of salient poles 32B protruding in the radial direction from the outer peripheral surface of the core main body part 32A, and the plurality of permanent magnets 33 are disposed between the plurality of adjacent salient poles 32B and abut against the salient poles 32B. Besides, the load reception block 70 has the annular part 70A arranged to overlap the end surface of the core main body part 32A in the axial direction, and the plurality of legs 70B that protrude in the radial direction from the outer peripheral surface of the annular part 70A and are arranged to overlap the end surface of each of the salient poles 32B in the axial direction. Therefore, the end of the permanent magnet 33 having a long length in the axial direction can be arranged in a space surrounded by the pair of adjacent legs 70B of the load reception block 70 and the outer peripheral surface of the annular part 70A. Thus, in the rotor 9 of the embodiment, the length of the permanent magnet 33 can be sufficiently secured, and the input of the caulking load to the end of the permanent magnet 33 can be suppressed more advantageously.

In addition, in the rotor 9 of the embodiment, because the leg 70B of the load reception block 70 extends to a position in the radial direction equal to the end of the corresponding salient pole 32B of the rotor core 32 in the radial direction, the caulking load is less likely input to the outer end of the permanent magnet 33 in the radial direction. However, if the leg 70B of the load reception block 70 extends to an outer position in the radial direction from an abutting region of the salient pole 32B of the rotor core 32 with the permanent magnet 33, the caulking load can be advantageously prevented from being input to the vicinity of a support region (the abutting region of the leg 70B) of the permanent magnet 33 by the leg 70B.

In addition, in the rotor 9 of the embodiment, the locking claw 74 (the core regulation part) that engages with the rotor core 32 to regulate the displacement of the rotor core 32 in the peripheral direction is arranged in the load reception block 70. Therefore, the rotor core 32 can be accurately positioned in the peripheral direction with respect to the load reception block 70.

Particularly, the rotor 9 of the embodiment has a configuration in which the locking claw 74 arranged in a protruding state in the load reception block 70 is locked to the relief groove 73 (the engagement part 73a) in the inner periphery of the core main body part 32A. Therefore, even if the caulking load acts from the outer peripheral side of the load reception block 70 radially inward during the caulking work, the locking claw 74 can be prevented from being displaced in the relief groove 73 and an excessive stress can be prevented from being concentrated on the locking claw 74. Thus, when this configuration is adopted, the locking claw 74 can be prevented from being damaged due to the input of the caulking load.

Furthermore, in the rotor 9 of the embodiment, the magnet regulating piece 75 (the first magnet regulating part) that abuts against the permanent magnet 33 in the axial direction and regulates the displacement of the permanent magnet 33 in the axial direction is arranged in the annular part 70A of the load reception block 70. Therefore, the position deviation of the permanent magnet 33 in the axial direction can be regulated by the magnet regulating piece 75 on the outer periphery of the annular part 70A.

In addition, in the rotor 9 of the embodiment, the press fit protrusion 76 that regulates the displacement of the permanent magnet 33 in the peripheral direction is arranged on the side surface of the leg 70B of the load reception block 70. Therefore, the position deviation of the permanent magnet 33 in the peripheral direction can be regulated by the press fit protrusion 76 of the leg 70B. In addition, rattling of the permanent magnet 33 in the axial direction can also be suppressed by pressing the press fit protrusion 76 against the end surface (the abutting surface 33a) of the permanent magnet 33.

In addition, in the rotor 9 of the embodiment, the magnet position detecting protrusion 77 that protrudes to the outside of the magnet cover 71 is arranged in a protruding state in the load reception block 70. Therefore, after the rotor core 32, the permanent magnet 33, and the load reception block 70 are assembled in the magnet cover 71, the position of the permanent magnet 33 can be accurately detected using the magnet position detecting protrusion 77. Thus, when this configuration is adopted, the permanent magnet 33 in the magnet cover 71 can be magnetized accurately.

Modification Example 1 of First Embodiment

Figure 10:
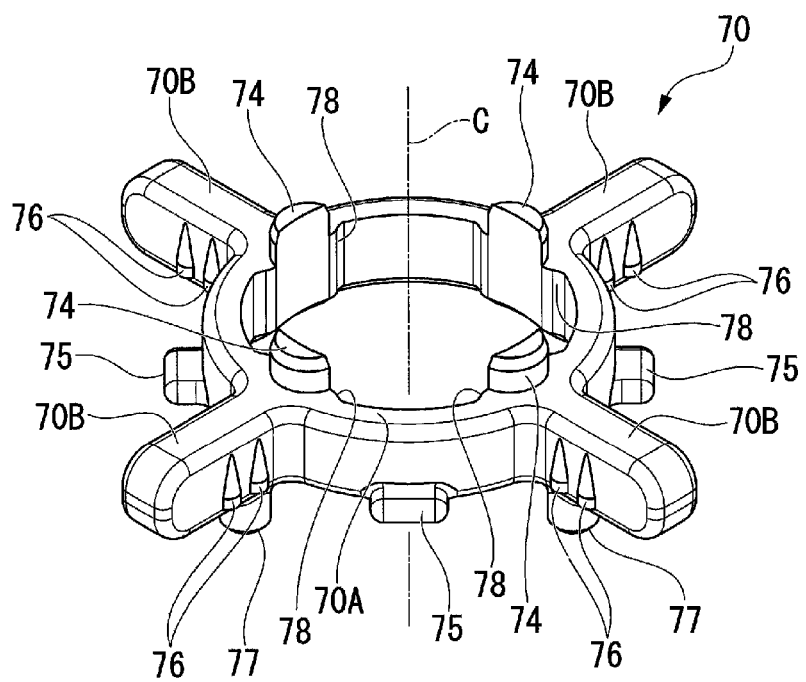
FIG. 10 is a perspective view of a load reception block of Modification example 1 of the first embodiment.
Figure 11:
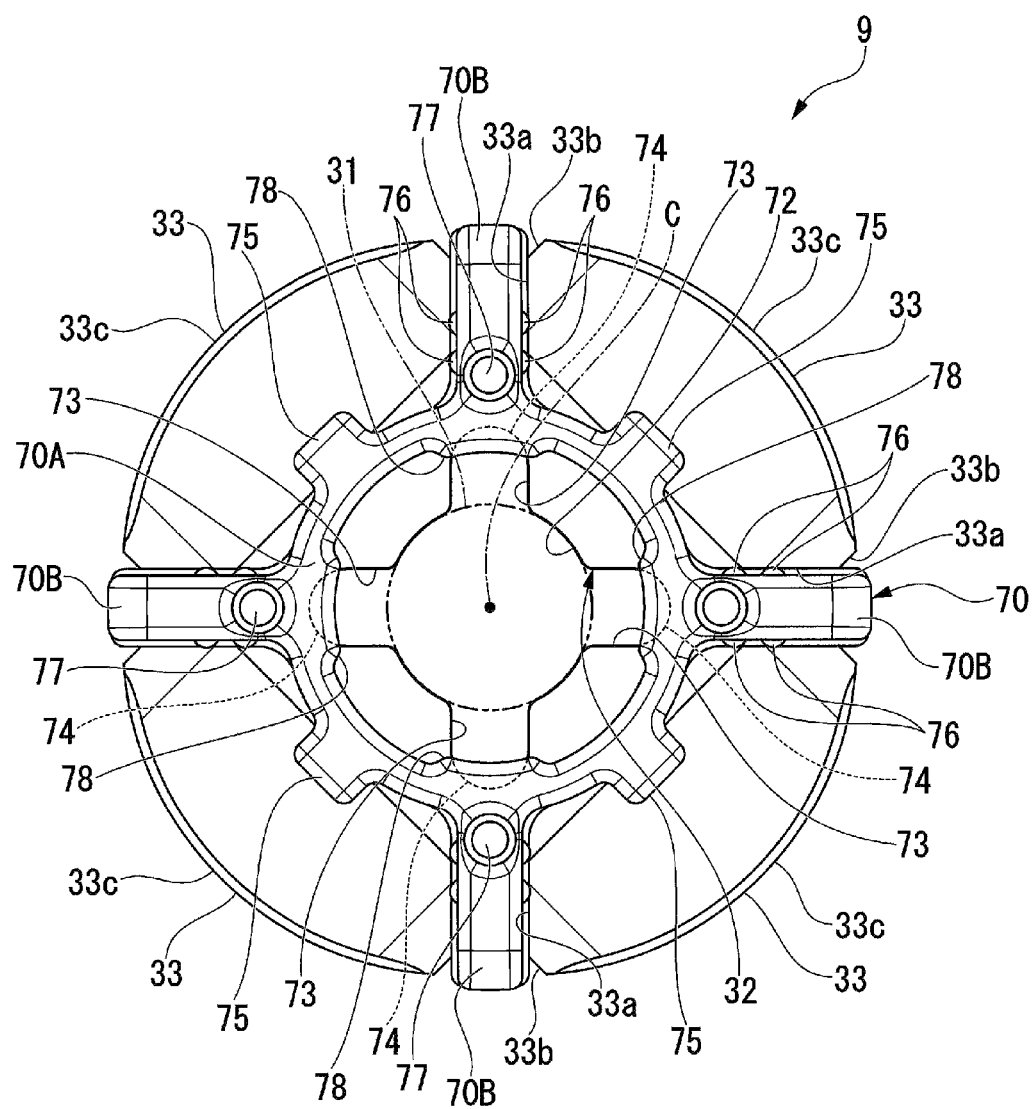
FIG. 11 is a plan view of a rotor of Modification example 1 of the first embodiment with a magnet cover removed.

FIG. 10 is a perspective view of the load reception block 70 of Modification example 1 of the first embodiment, and FIG. 11 is a plan view of the rotor 9 with the magnet cover removed.

The rotor 9 of the modification example has almost the same basic configuration as the above, but the shape of the load reception block 70 is partially different from the above. The load reception block 70 has the annular part 70A and four legs 70B, and the locking claw 74 is arranged in a protruding state at an extension upper position of each leg 70B on the inner peripheral edge of the annular part 70A. A bulging part 78 that bulges radially inward is formed at an extension upper position of each leg 70B on the inner peripheral surface of the annular part 70A. The bulging part 78 is formed to have a width wider than a width of the locking claw 74 in the radial direction. The locking claw 74 is arranged in a protruding state on the inner peripheral edge of the annular part 70A in a manner of partially straddling the bulging part 78. The bulging part 78 is capable of axially abutting against the edge of the relief groove 73 on the end surface of the core main body part 32A of the rotor core 32.

In the modification example, a root part (the vicinity) of the locking claw 74 on the inner peripheral surface of the annular part 70A of the load reception block 70 is reinforced by the bulging part 78. Therefore, when the rotary shaft 31 of the motor is press-fitted into the inner peripheral surface of the rotor core 32 from the axial direction, a large press-fitting load acting on the rotor core 32 can be received by the bulging part 78. Thus, when the configuration of this modification example is adopted, the position deviation of the rotor core 32 in the axial direction can be prevented when the rotary shaft 31 is press-fitted into the rotor core 32.

Modification Examples 2 to 4 of First Embodiment

Figure 12:
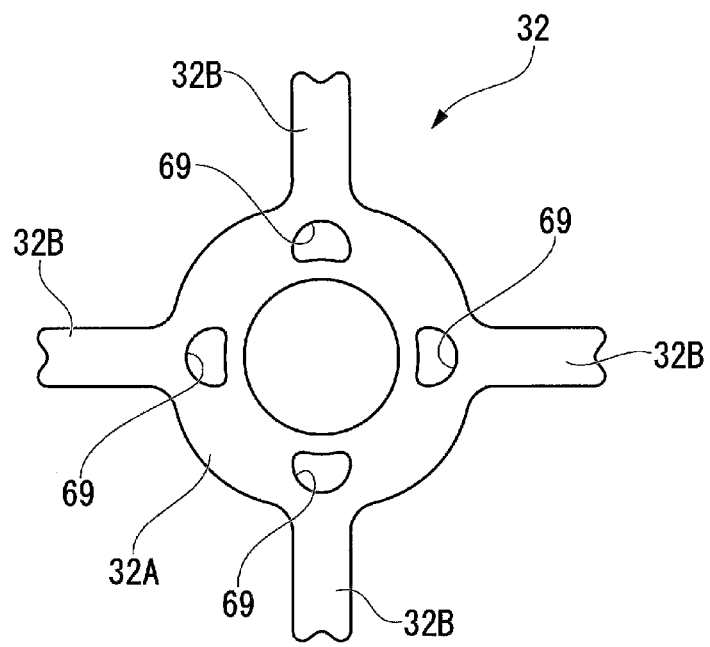
FIG. 12 is a plan view of a rotor core of Modification example 2 of the first embodiment.
Figure 13:
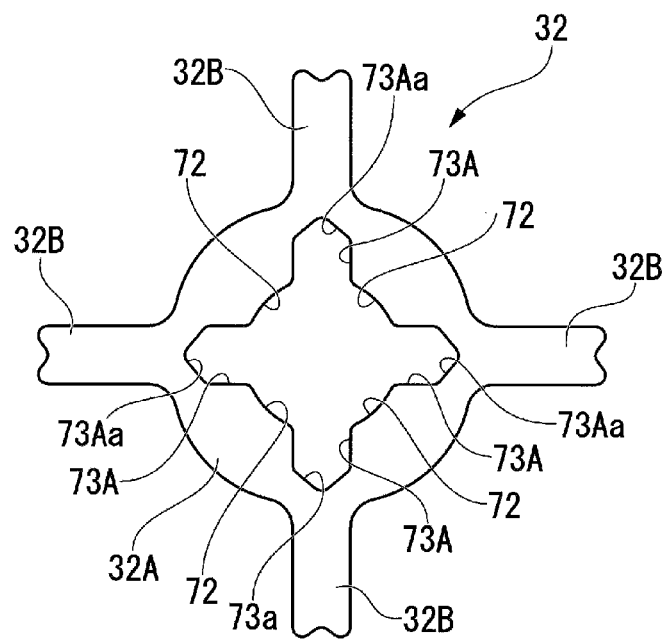
FIG. 13 is a plan view of a rotor core of Modification example 3 of the first embodiment.
Figure 14:
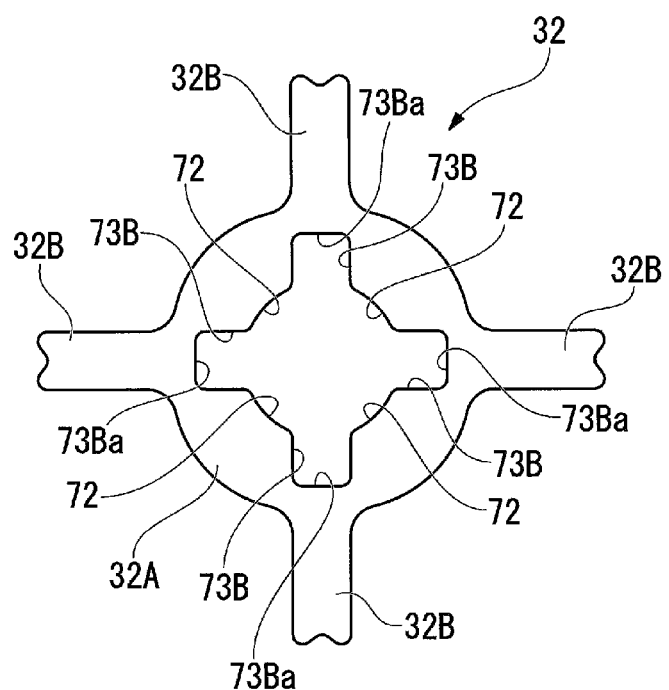
FIG. 14 is a plan view of a rotor core of Modification example 4 of the first embodiment.

FIG. 12, FIG. 13, and FIG. 14 are plan views showing each rotor core 32 of Modification examples 2 to 4 of the first embodiment.

The rotor core 32 of each modification example differs only in the shape of a receiving part to which the locking claw on the load reception block side is engaged, and configurations of other parts are the same as those described above. In Modification example 2 shown in FIG. 12, the receiving part formed in the core main body part 32A of the rotor core 32 is configured by a semi-circular hole 69. In Modification example 3 shown in FIG. 13, the receiving part formed in the core main body part 32A of the rotor core 32 is configured by the relief groove 73A and a triangular engagement part 73Aa at the end of the relief groove 73A. In Modification example 4 shown in FIG. 14, the receiving part formed in the core main body part 32A of the rotor core 32 is configured by the relief groove 73B and a quadrangular engagement part 73Ba at the end of the relief groove 73B.

Detailed Structure of Rotor of Second Embodiment

Figure 15:
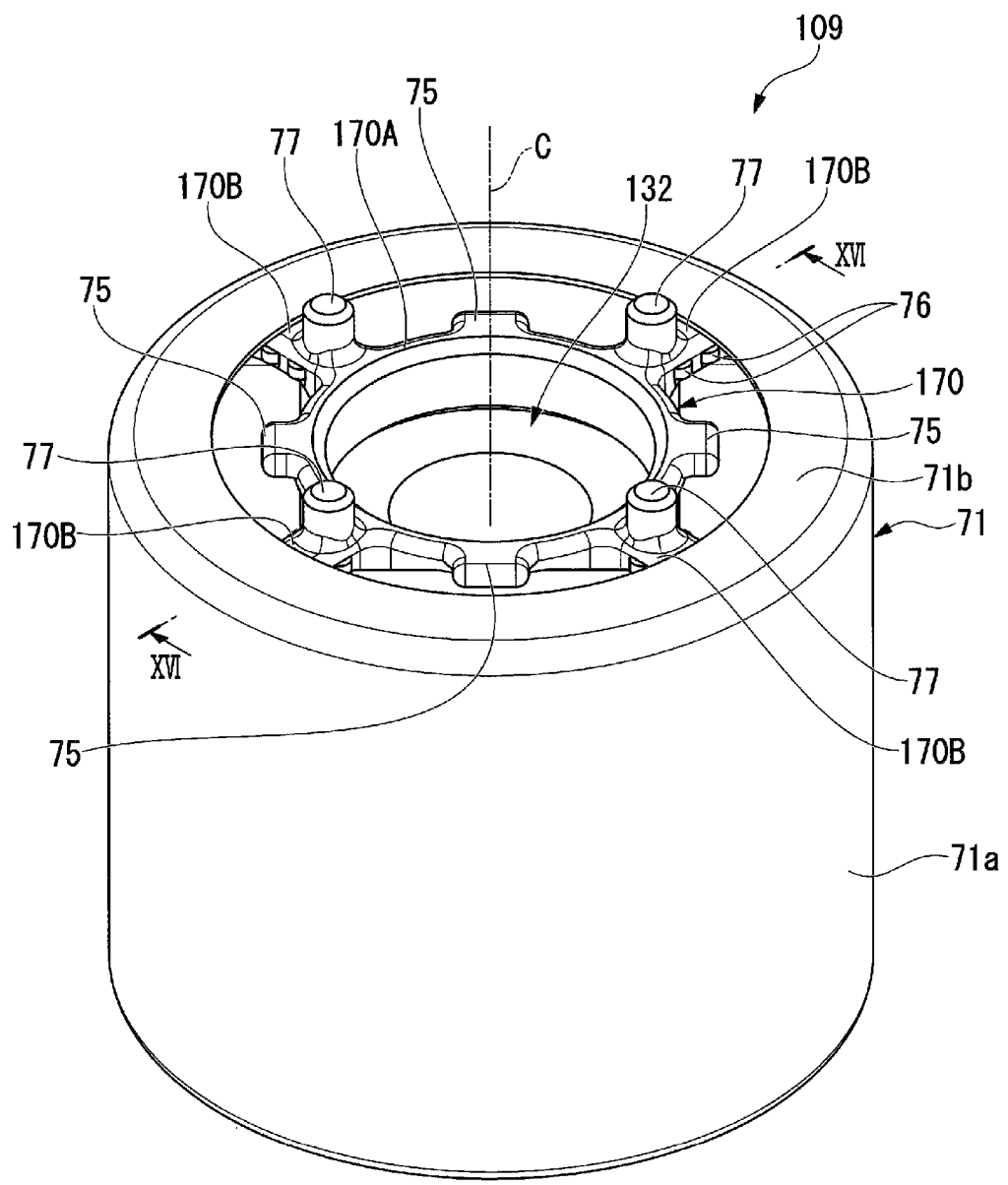
FIG. 15 is a perspective view of a rotor of a second embodiment.
Figure 16:
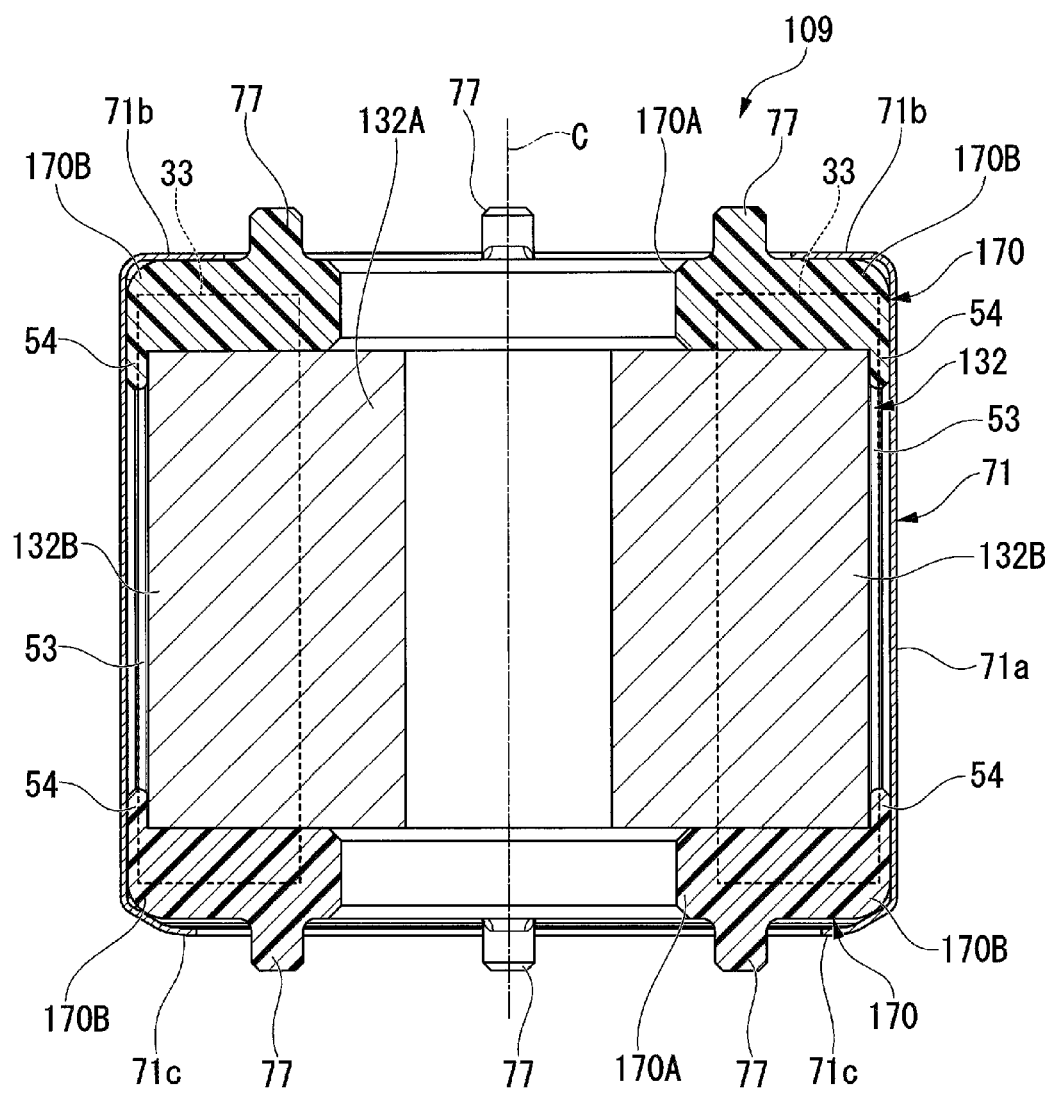
FIG. 16 is a cross-sectional view of the rotor of the second embodiment along a XVI-XVI line in FIG. 15.
Figure 17:
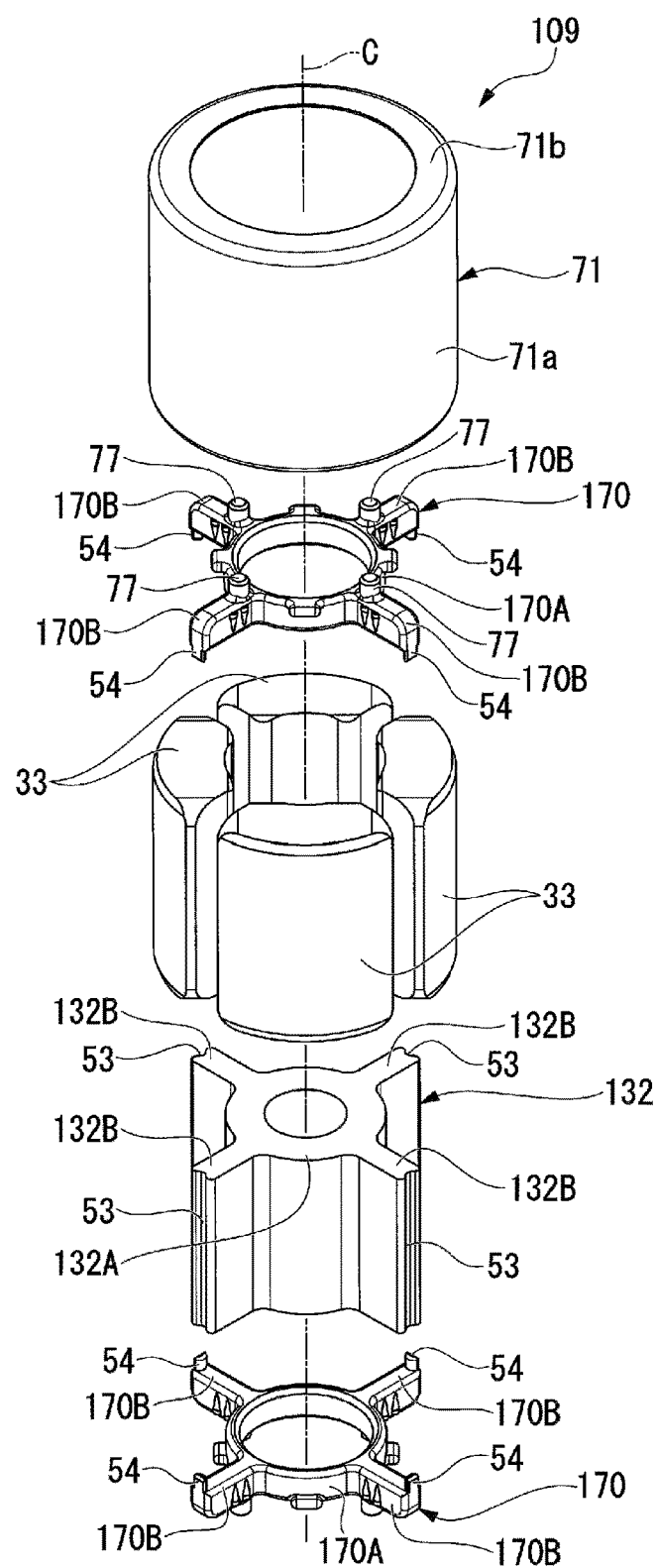
FIG. 17 is an exploded perspective view of the rotor of the second embodiment.
Figure 18:
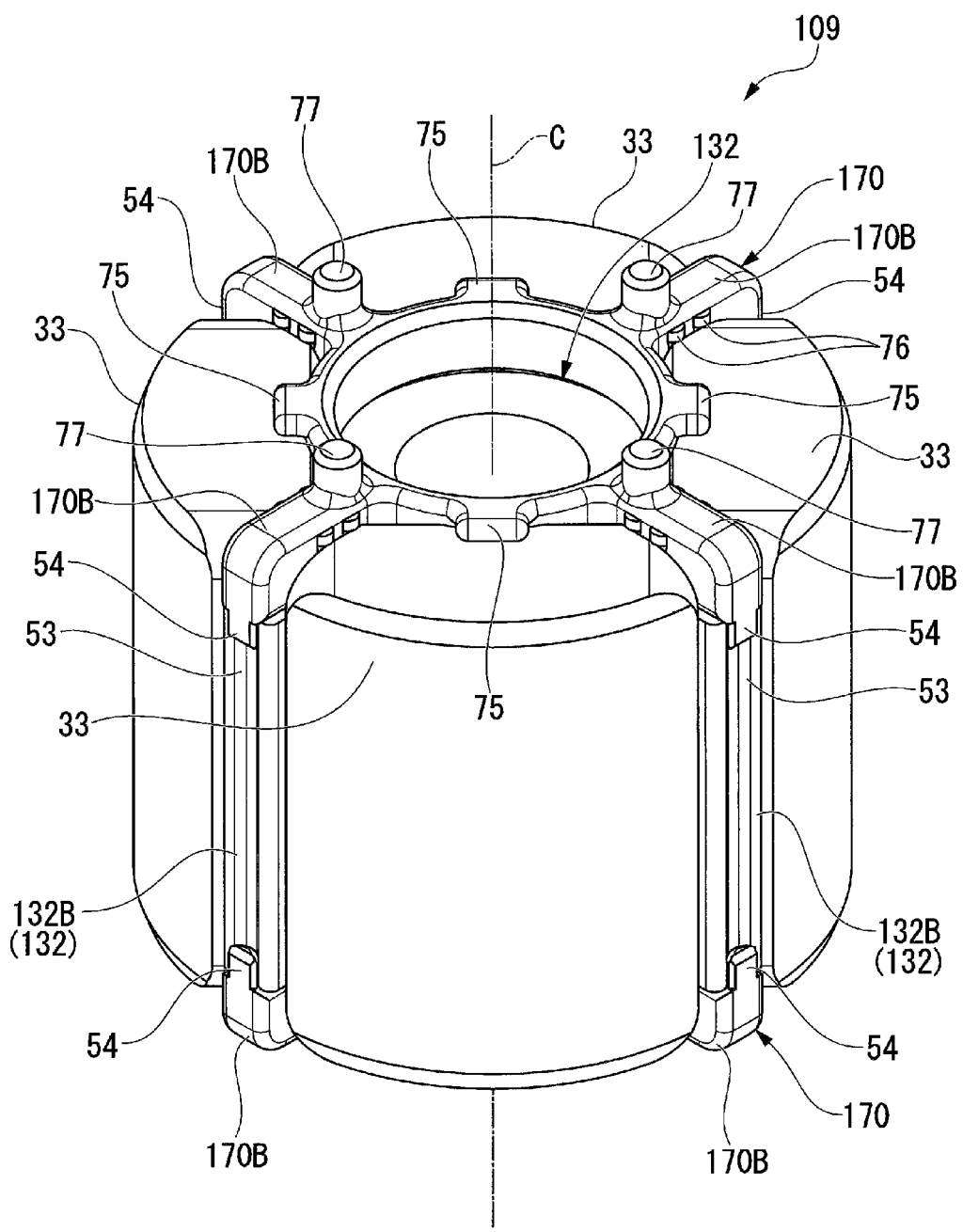
FIG. 18 is a perspective view of the rotor of the second embodiment with a magnet cover removed.

FIG. 15 is a perspective view of a rotor 109 of a second embodiment, and FIG. 16 is a cross-sectional view of the rotor 109 along a XVI-XVI line in FIG. 15. In addition, FIG. 17 is an exploded perspective view of the rotor 109, and FIG. 18 is a perspective view of the rotor 109 with the magnet cover 71 removed.

The basic configuration of the rotor 109 of the second embodiment is the same as that of the first embodiment in that: four permanent magnets 33 are arranged on the outer peripheral part of a rotor core 132; a pair of load reception blocks 170 is arranged to overlap both ends of the rotor core 132 in the axial direction; the load reception block 170 is accommodated inside the magnet cover 71 having a substantially cylindrical shape, together with the rotor core 132 and the permanent magnet 33; the flange parts 71b and 71c are arranged at both ends of the magnet cover 71 in the axial direction and the flange part 71c constitutes a caulking flange; and the like. In the rotor 109 of the embodiment, the structure of an engagement part of the load reception block 170 with respect to the rotor core 132 is significantly different from that of the rotor 9 of the first embodiment.

The rotor core 132 has a substantially cylindrical core main body part 132A and four salient poles 132B protruding in the radial direction from the outer peripheral surface of the core main body part 132A. A recessed groove 53 extending along the axial direction is formed in the outer end surface of each of the salient poles 132B in the radial direction. In addition, the inner peripheral surface of the core main body part 132A is formed in a smooth peripheral surface shape without a relief groove or the like.

In addition, the load reception block 170 has an annular part 170A arranged to overlap the end surface of the core main body part 132A of the rotor core 132 in the axial direction, and four legs 170B that are arranged to protrude in the radial direction from the outer peripheral surface of the annular part 170A and overlap the end surface of each of the salient poles 132B of the rotor core 132 in the axial direction. Similar to the first embodiment, the magnet regulating piece 75 (the first magnet regulating part) that regulates the displacement of each permanent magnet 33 in the axial direction is arranged in a protruding state radially outward at a substantially intermediate position of each adjacent leg 170B on the outer peripheral edge of the annular part 170A. The pair of press fit protrusions 76 (the second magnet regulating parts) is formed on the side surface of each leg 170B on the base side. In addition, the magnet position detecting protrusion 77 that protrudes to the outside of the magnet cover 71 along the axial direction is formed near the base of each leg 170B.

Figure 19:
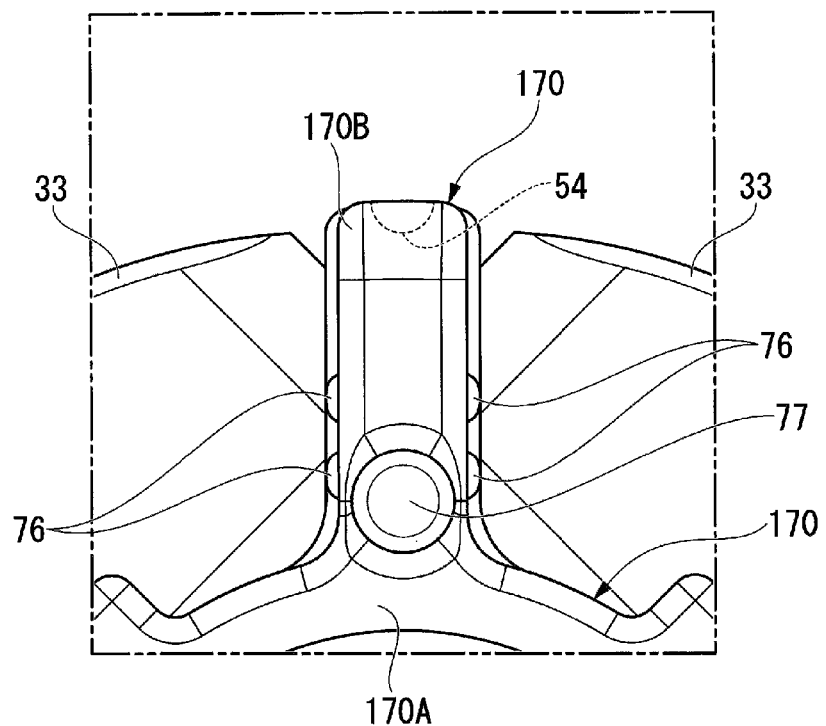
FIG. 19 is a plan view of a part of the rotor of the second embodiment with the magnet cover removed.
Figure 20:
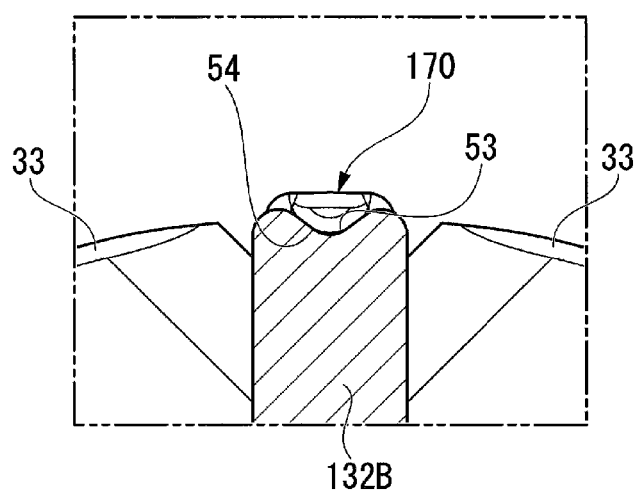
FIG. 20 is a partial cross-sectional top view of a part of the rotor of the second embodiment with the magnet cover removed.

FIG. 19 is a plan view of a part of the rotor 9 with the magnet cover removed, and FIG. 20 is an upper top view of a part of the rotor showing the salient pole 132B of the rotor core 32 in a cross section.

The load reception block 170 has a locking claw 54 integrally formed at the outer end of each leg 170B in the radial direction. The locking claw 54 is bent in the axial direction from the outer end of the leg 170B in the radial direction, and can be fitted into the recessed groove 53 of the corresponding salient pole 132B of the rotor core 132 from the outside in the radial direction. The locking claw 54 is fitted into the recessed groove 53 of the salient pole 132B to regulate the displacement of the rotor core 32 in the peripheral direction.

As described above, the rotor 109 of the embodiment is different from that of the first embodiment in a structure of the engagement part of the load reception block 170 to the rotor core 132, but otherwise has the same basic configuration as that of the first embodiment. Therefore, a basic effect almost the same as that of the first embodiment described above can be obtained.

Modification Example 1 of Second Embodiment

Figure 21:
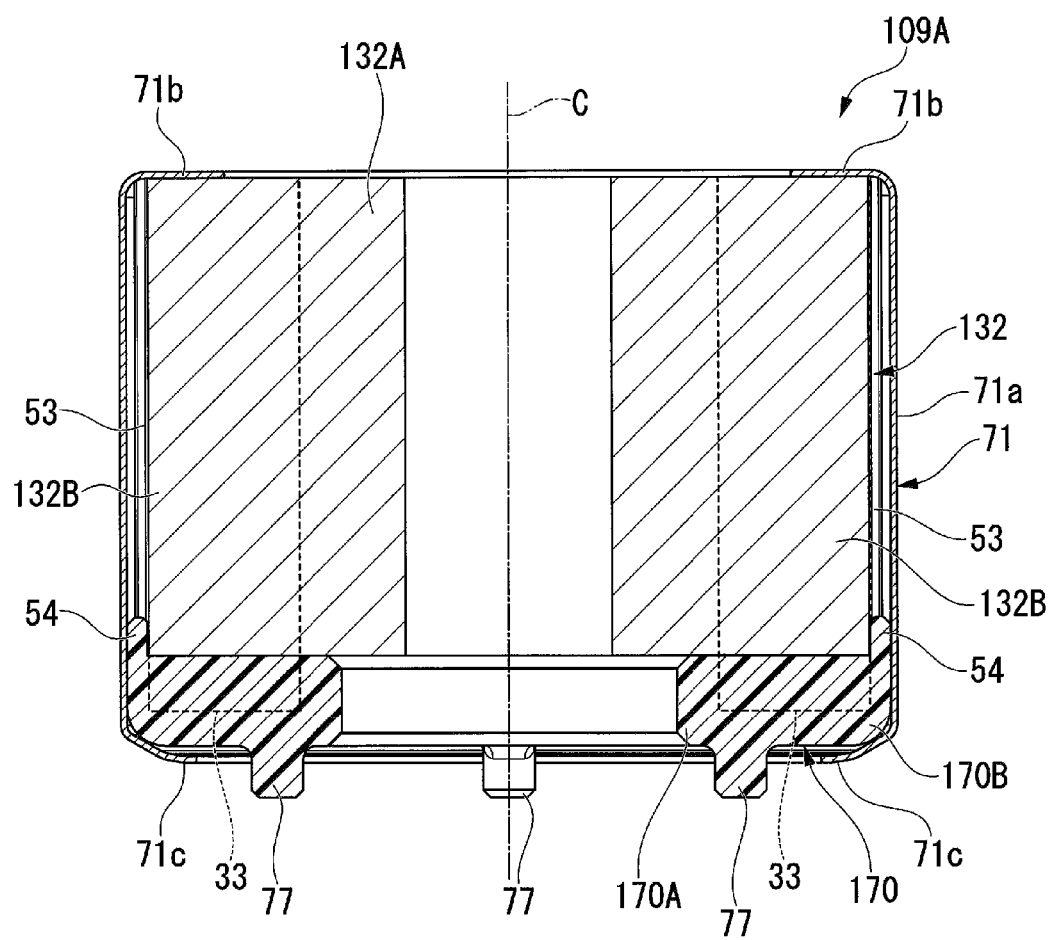
FIG. 21 is a cross-sectional view similar to FIG. 16 of a rotor of Modification example 1 of the second embodiment.

FIG. 21 is a cross-sectional view similar to FIG. 16 of the rotor 109A of Modification example 1 of the second embodiment.

In the rotor 109A of Modification example 1, only one end side in the axial direction of the permanent magnet 33 arranged on the outer periphery of the rotor core 132 extends to the outside in the axial direction with respect to the end surface of the rotor core 132 on the same side. Therefore, the load reception block 170 is arranged only on one end side of the rotor core 132 in the axial direction. Also in this case, when the flange part 71c of the magnet cover 71 is caulked, the load can be received by the load reception block 170.

Thus, in the case of Modification example 1, the damage or deterioration of the permanent magnet 33 can also be suppressed.

Modification Example 2 of Second Embodiment

Figure 22:
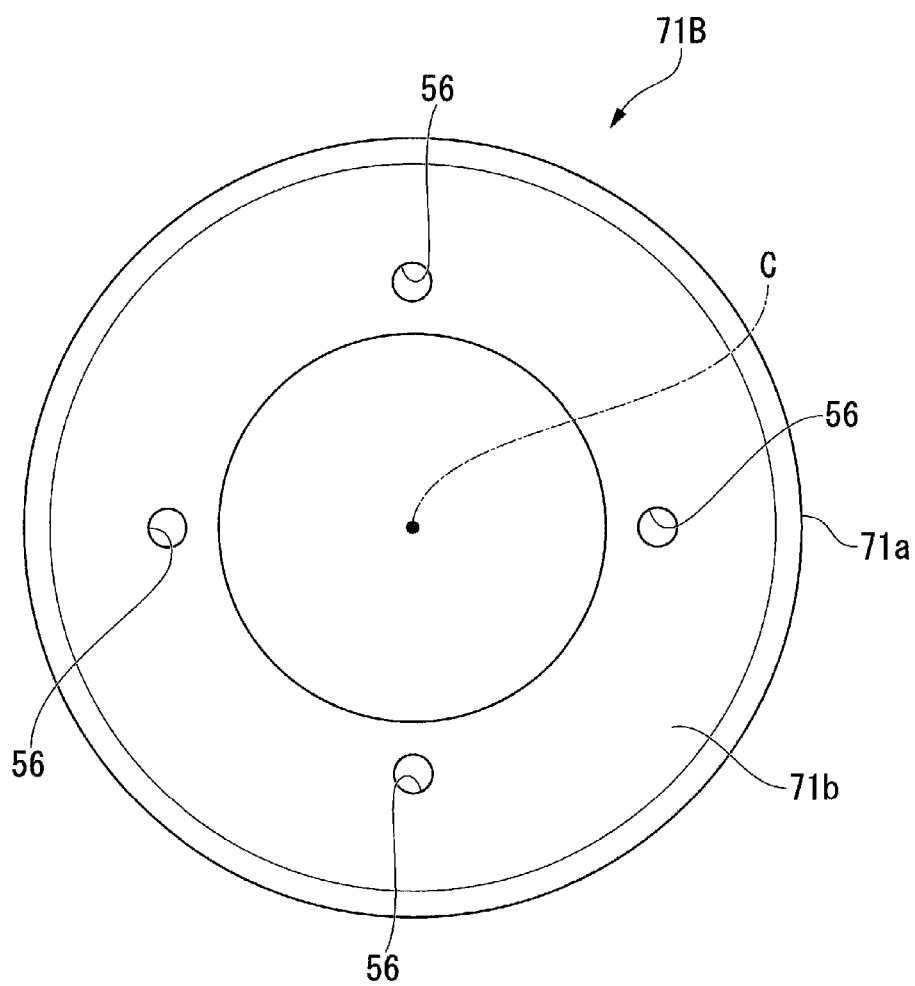
FIG. 22 is a plan view of a magnet cover of Modification example 2 of the second embodiment.
Figure 23:
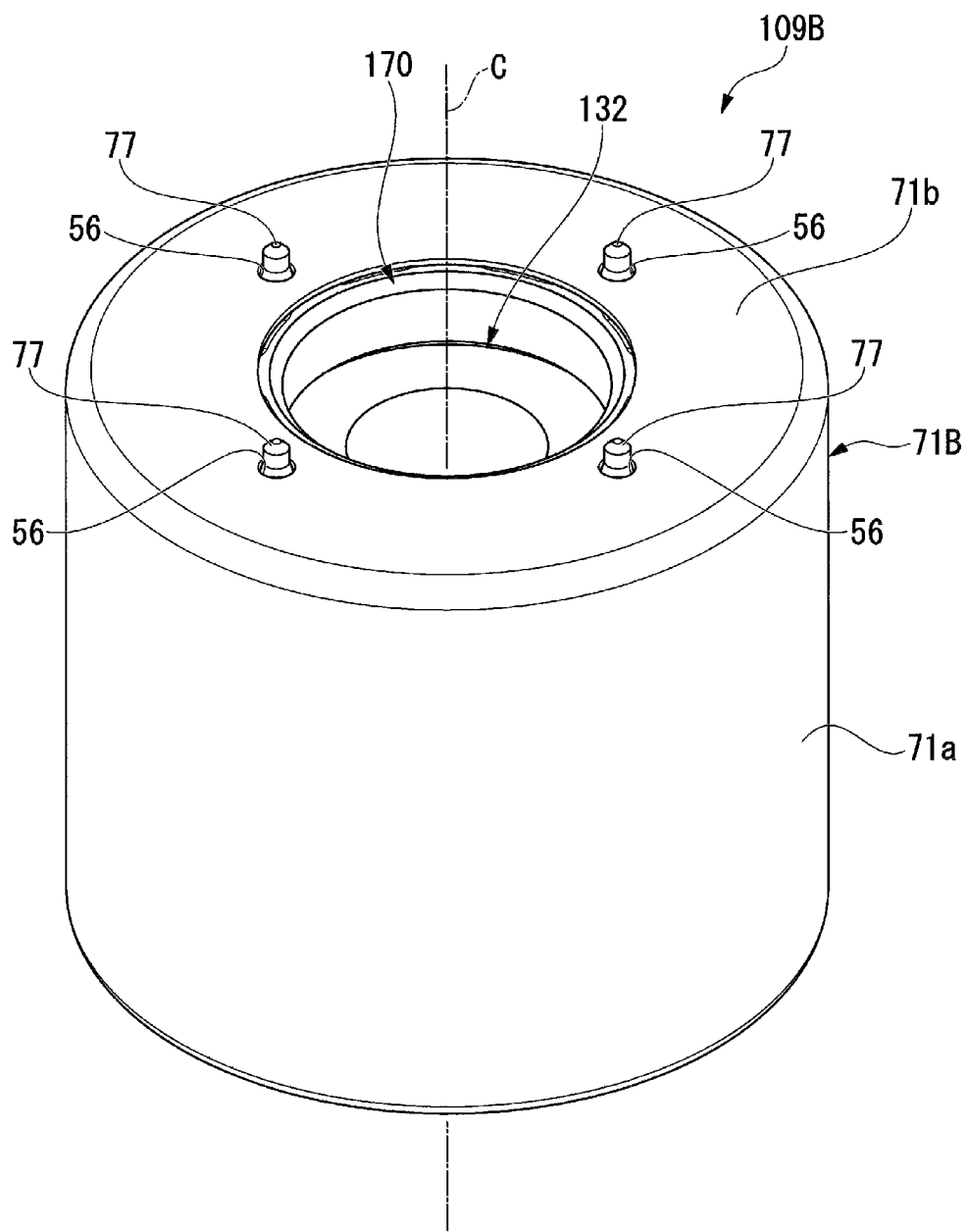
FIG. 23 is a perspective view of a rotor of Modification example 2 of the second embodiment.

FIG. 22 is a plan view of a magnet cover 71B of Modification example 2 of the second embodiment, and FIG. 23 is a perspective view of the rotor 109B of the second modification example.

In this modification example, the through-hole 56 corresponding to the magnet position detecting protrusion 77 of the load reception block 170 is formed in the flange part 71b on a side previously formed on the magnet cover 71B. The magnet position detecting protrusion 77 of the load reception block 170 arranged in the magnet cover 71B is fitted into the through-hole 56. The magnet position detecting protrusion 77 protrudes to the outside of the magnet cover 71B through the through-hole 56.

In the rotor 109B of the modification example, because the magnet position detecting protrusion 77 of the load reception block 170 is fitted into the through-hole 56 of the magnet cover 71B, the load reception block 170 can be positioned with respect to the magnet cover 71B through the magnet position detecting protrusion 77.

Detailed Structure of Rotor of Third Embodiment

Figure 24:
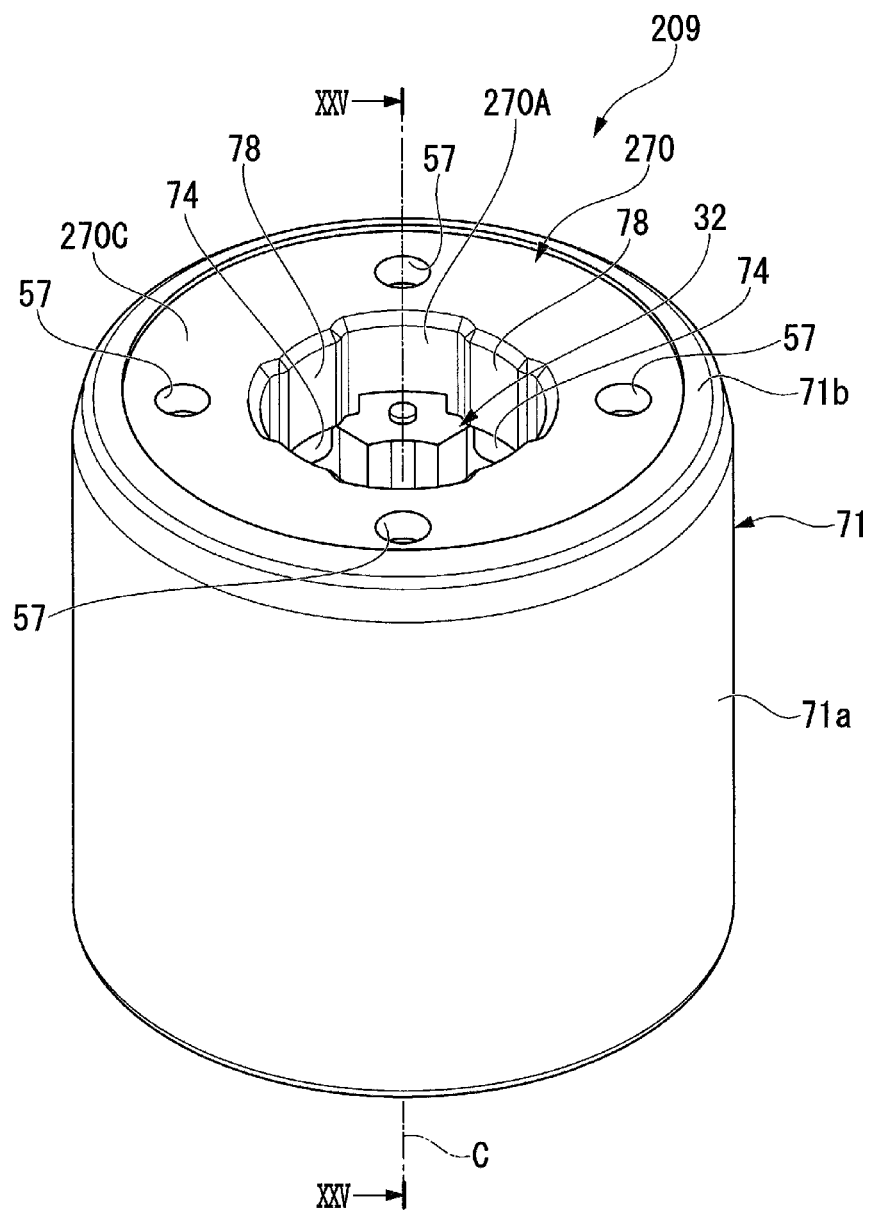
FIG. 24 is a perspective view of a rotor of a third embodiment.
Figure 25:
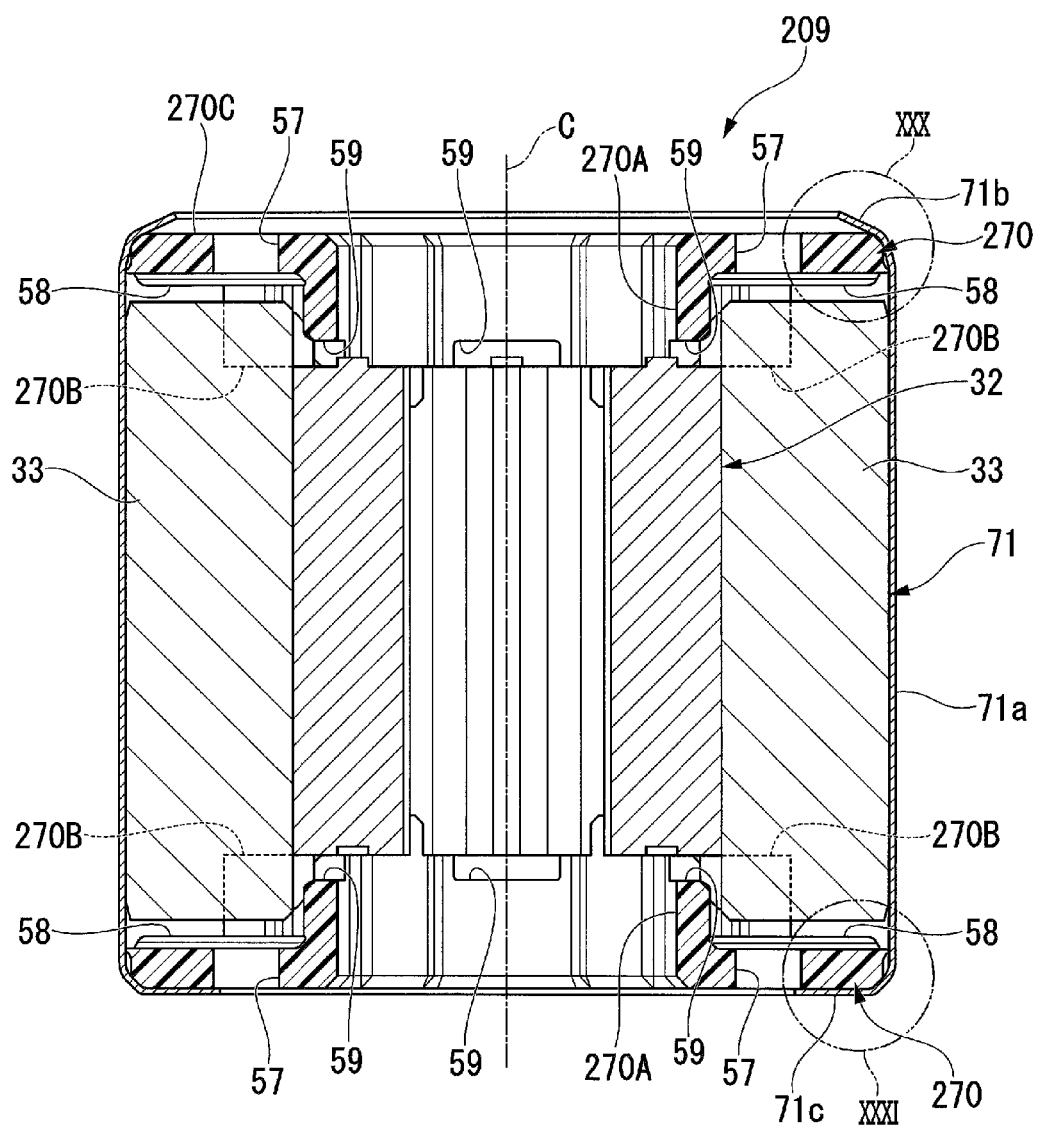
FIG. 25 is a cross-sectional view of the rotor of the third embodiment along a XXV-XXV line in FIG. 24.
Figure 26:
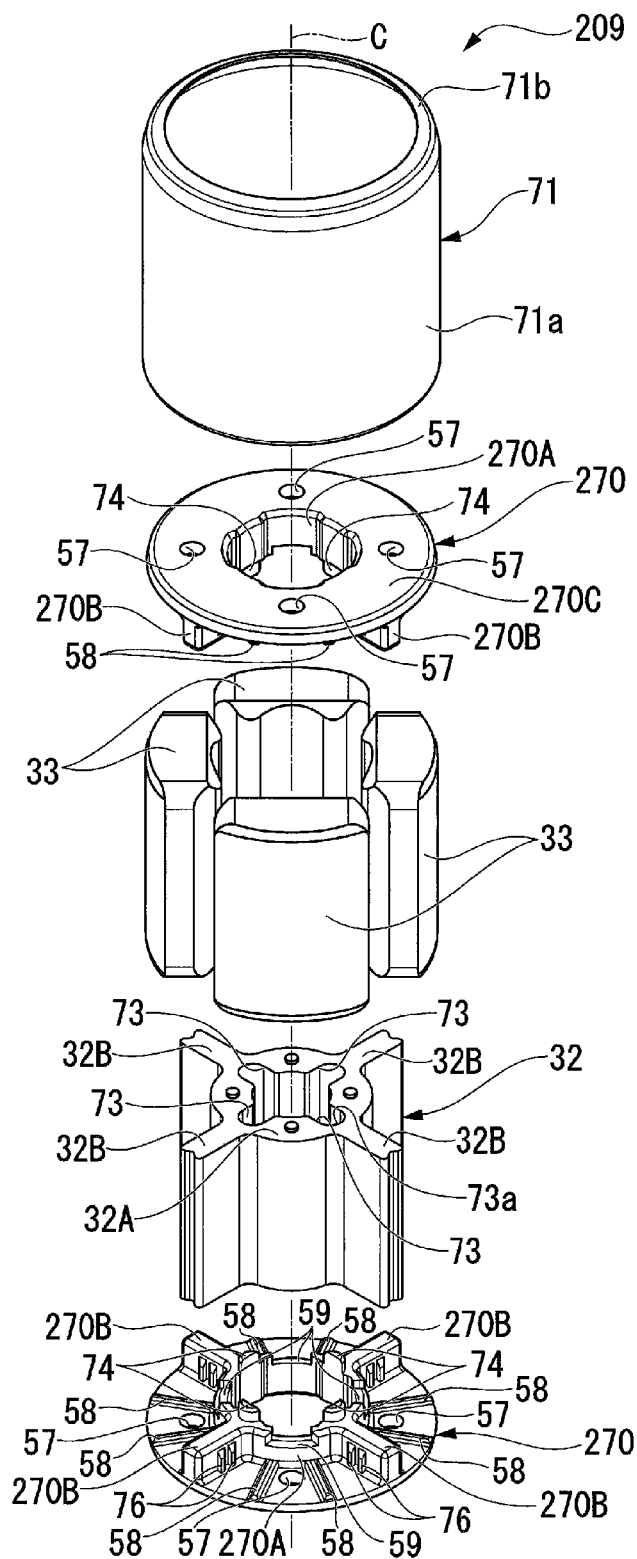
FIG. 26 is an exploded perspective view of the rotor of the third embodiment.
Figure 27:
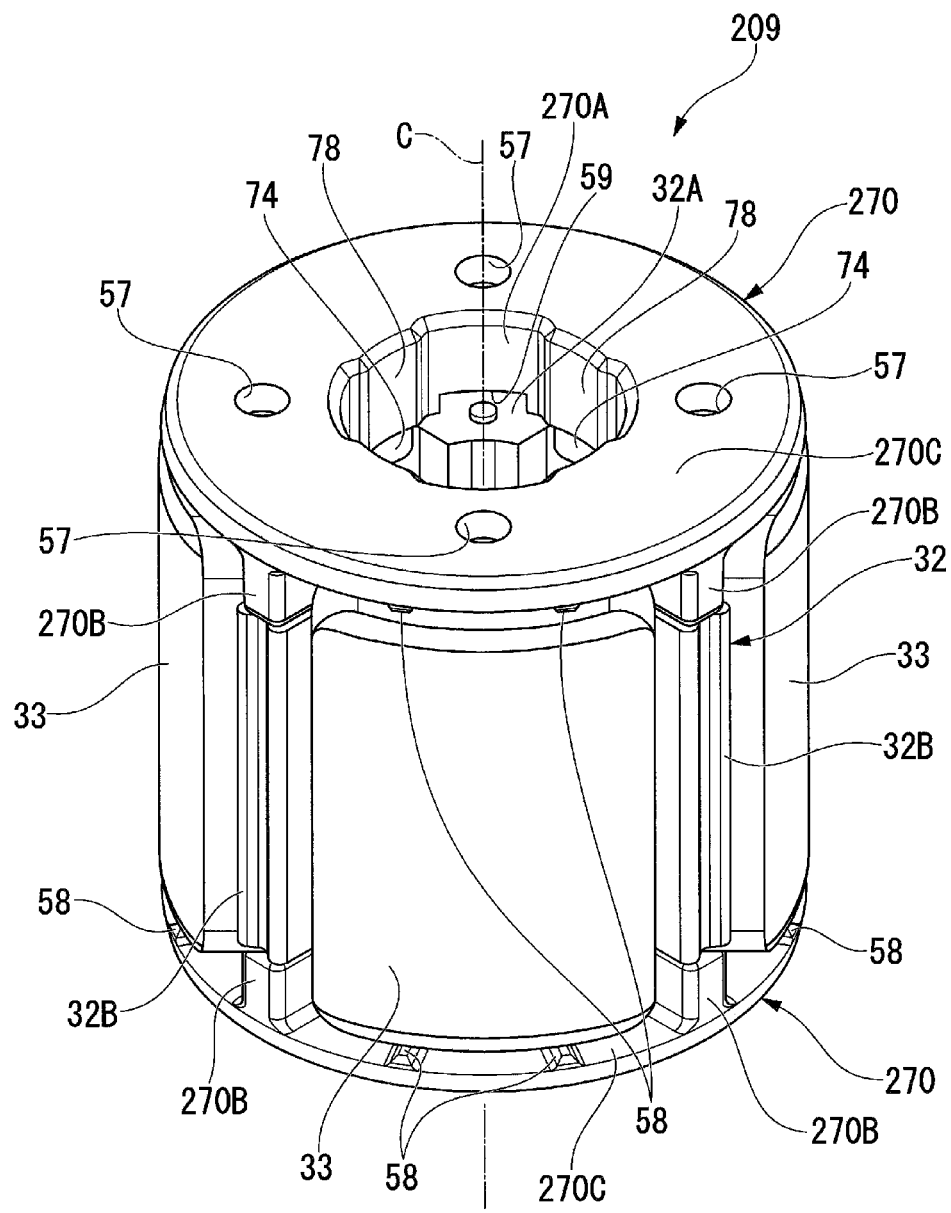
FIG. 27 is a perspective view of the rotor of the third embodiment with a magnet cover removed.
Figure 28:
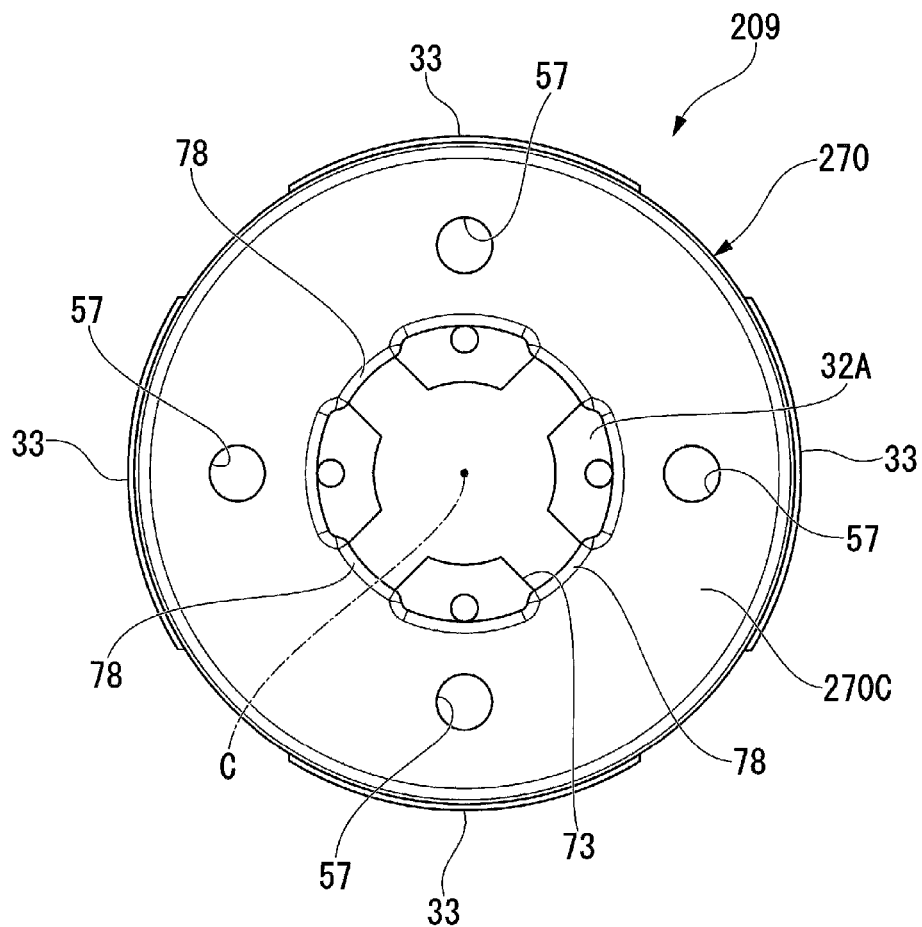
FIG. 28 is a plan view of the rotor of the third embodiment with the magnet cover removed.

FIG. 24 is a perspective view of a rotor 209 of a third embodiment, and FIG. 25 is a cross-sectional view of the rotor 209 along a XXV-XXV line in FIG. 24. In addition, FIG. 26 is an exploded perspective view of the rotor 209, FIG. 27 is a perspective view of the rotor 209 with the magnet cover 71 removed, and FIG. 28 is a plan view of the rotor 209 with the magnet cover 71 removed.

The basic configuration of the rotor 209 of the third embodiment is the same as that of the first embodiment in that: four permanent magnets 33 are arranged on the outer peripheral part of the rotor core 32; a pair of load reception blocks 270 is arranged to overlap both ends of the rotor core 32 in the axial direction; the load reception block 270 is accommodated inside the magnet cover 71 having a substantially cylindrical shape, together with the rotor core 32 and the permanent magnet 33; the flange parts 71b and 71c are arranged at both ends of the magnet cover 71 in the axial direction; and the like. In the rotor 209 of the embodiment, the structure of the load reception block 270 arranged to overlap both ends of the rotor core 32 in the axial direction is significantly different from that of the rotor 9 of the first embodiment.

Figure 29:
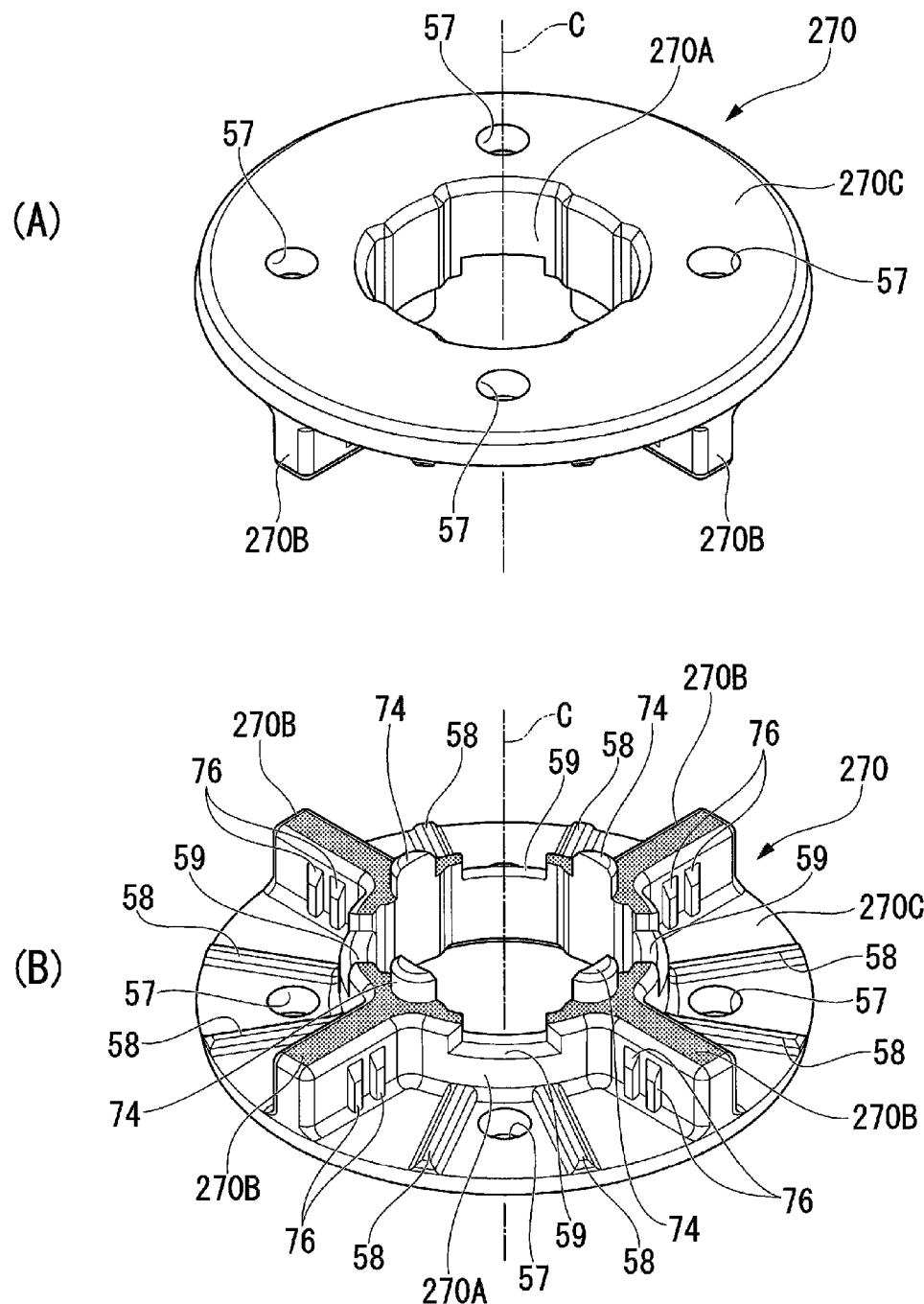
FIG. 29 shows perspective views of a load reception block of the third embodiment.

FIG. 29 shows perspective views of the load reception block 270. FIG. 29(A) is a view of the load reception block 270 viewed from one end side in the axial direction, and FIG. 29(B) is view of the load reception block 270 viewed from the other end side in the axial direction.

The load reception block 270 has an annular part 270A, four legs 270B protruding in the radial direction from the outer peripheral surface of the annular part 270A, and a perforated disk-shaped end wall 270C that is integrally connected to the axially outer side of the annular part 270A and the leg 270B and protrudes radially outward from the annular part 270A. The annular part 270A is arranged to overlap the end surface of the core main body part 32A of the rotor core 32 in the axial direction. The four legs 270B are arranged to overlap the end surface of each of the salient poles 32B of the rotor core 32 in the axial direction. The end wall 270C is formed in a disk shape (perforated disk shape) having a radius almost the same as the length from the axis center C of the rotor core 32 to the front end of the leg 270B. The end wall 270C closes the space between the legs 270B adjacent to each other in the circumferential direction at an outer position of the leg 270B in the axial direction.

A circular confirmation hole 57 is formed at a position between the adjacent legs 270B on the end wall 270C. The confirmation hole 57 is formed at a position facing the end surface of each permanent magnet 33 in the axial direction in order that the position of each permanent magnet 33 can be visually confirmed from the outside of the rotor core 32 when the load reception block 270 is assembled in the magnet cover 71 together with the rotor core 32 holding the permanent magnet 33. In the case of the embodiment, four confirmation holes 57 are arranged to have a one-to-one correspondence with each permanent magnet 33.

In the case of the rotor 209 of the embodiment, the outer end of the load reception block 270 in the axial direction is covered with the end wall 270C having a substantially disk shape. Therefore, when the load reception block 270 is inserted into the magnet cover 71 together with the rotor core 32 holding the permanent magnet 33 and the ends (the flange parts 71b and 71c) of the magnet cover 71 are caulked in this state, the ends of the magnet cover 71 are caulked to be fixed to this end wall 270C in a manner of covering the entire outer periphery of the end wall 270C.

Here, the outer surface of the end wall 270C in the axial direction of the load reception block 270 is formed flat in order that the caulking load acts uniformly over the entire outer periphery of the end wall 270C when the ends of the magnet cover 71 are caulked (see FIG. 29(A)). On the other hand, on the inner surface of the end wall 270C in the axial direction, a plurality of reinforcing ribs 58 extending in the radial direction are arranged in a protruding state as shown in FIG. 29(B). In the case of the embodiment, two reinforcing ribs 58 are disposed between legs 270B adjacent to each other in the peripheral direction of the inner surface of the end wall 270C in the axial direction.

The reinforcing rib 58 suppresses deformation such as dents, waviness, and the like in the peripheral region of the end wall 270C when the load reception block 270 is molded with resin. Furthermore, the reinforcing rib 58 suppresses deformation of the outer peripheral edge of the end wall 270C of the load reception block 270 caused by the caulking load when the end of the magnet cover 71 is caulked. That is, the reinforcing rib 58 increases the rigidity of the outer peripheral edge of the end wall 270C. In addition, the reinforcing rib 58 faces the end surface of the permanent magnet 33 in the axial direction when the load reception block 270 is assembled in the magnet cover 71 together with the rotor core 32 holding the permanent magnet 33. When an excessive load acts on the permanent magnet 33 in the axial direction, the reinforcing rib 58 regulates the displacement of the permanent magnet 33 in the axial direction by abutting against the end surface of the permanent magnet 33.

Moreover, the reinforcing rib 58 may constantly abut against the end surface of the permanent magnet 33. In this case, the reinforcing rib 58 constitutes the first magnet regulating part that regulates the displacement of the permanent magnet 33 in the axial direction.

In addition, a plurality of recessed parts 59 having a low protrusion height from the end wall 270C are formed in the annular part 270A of the load reception block 270. Each recessed part 59 is disposed between base ends of the legs 270B adjacent to each other in the circumferential direction in the annular part 270A.

Here, when the load reception block 270 is assembled in the magnet cover 71, the part (a region of the inner end surface of the annular part 270A in the axial direction excluding the recessed part 59, and the inner end surface of each leg 270B in the axial direction) shown by dots in FIG. 29(B) abuts against the end surface of the core main body part 32A in the axial direction and the salient pole 32B of the rotor core 32.

In the embodiment, the region of the load reception block 270 protruding axially inward is separated into four blocks in the peripheral direction with the recessed part 59 interposed therebetween. Therefore, the molding die can be easily adjusted for accurately bringing the end surface of each block into contact with the end surface of the rotor core 32 in the axial direction.

Figure 30:
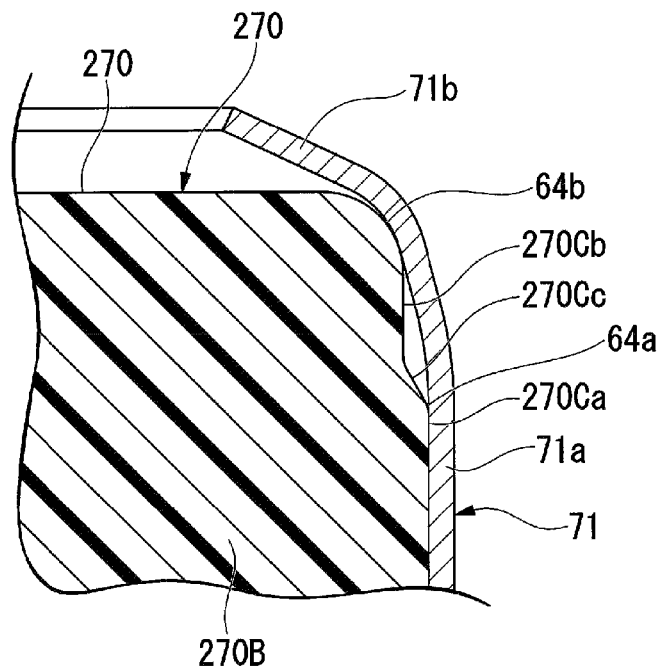
FIG. 30 is an enlarged cross-sectional view of a XXX part in FIG. 25 of the rotor of the third embodiment.

FIG. 30 is an enlarged cross-sectional view of a XXX part shown in FIG. 25 of the rotor 209.

As shown in the same drawing, a small diameter part 270Cb having an outer diameter slightly smaller than that of other parts (hereinafter referred to as "general part 270Ca") is formed at the outer end of the end wall 270C of the load reception block 270 in the axial direction. The general part 270Ca and the small diameter part 270Cb are connected by an inclined surface 270Cc that is inclined in a tapered shape from the general part 270Ca toward the small diameter part 270Cb. A space between the general part 270Ca and the inclined surface 270Cc is configured by a corner part 64a having an obtuse angle. Moreover, the space between the general part 270Ca and the inclined surface 270Cc may be configured by an arcuate curved surface part. In addition, the outer end of the small diameter part 270Cb in the axial direction (the outer end of the end wall 270C in the axial direction) is configured by an arcuate curved surface part 64b. The corner part 64a and the curved surface part 64b described above on the outer periphery of the end wall 270C are two caulking starting points when the end of the magnet cover 71 in the axial direction is caulked with respect to the load reception block 270. That is, the corner part 64a is an initial caulking starting point (a first caulking starting point) when the caulking load is applied to the end of the magnet cover 71 in the axial direction, and the curved surface part 64b is the next caulking starting point (a second caulking starting point) when the caulking load is applied to the end of the magnet cover 71 in the axial direction.

Thus, when this configuration of the embodiment is adopted, during the caulking of the end of the magnet cover 71 in the axial direction, the stress acting on the load reception block 270 from the magnet cover 71 can be relaxed, and the deterioration or damage of the load reception block 270 can be prevented.

In addition, the rotor 209 of the embodiment has a configuration in which the end wall 270C is arranged in the load reception block 270, and the end wall 270C covers the outer side of the permanent magnet 33 in the axial direction. Therefore, during the caulking of the end of the magnet cover 71, the assembly of the rotor 209 with other motor components, and the like, an unnecessary external force acts on the permanent magnet 33, which can prevent damage in the permanent magnet 33 from occurring.

Modification Example 1 of Third Embodiment

Figure 31:
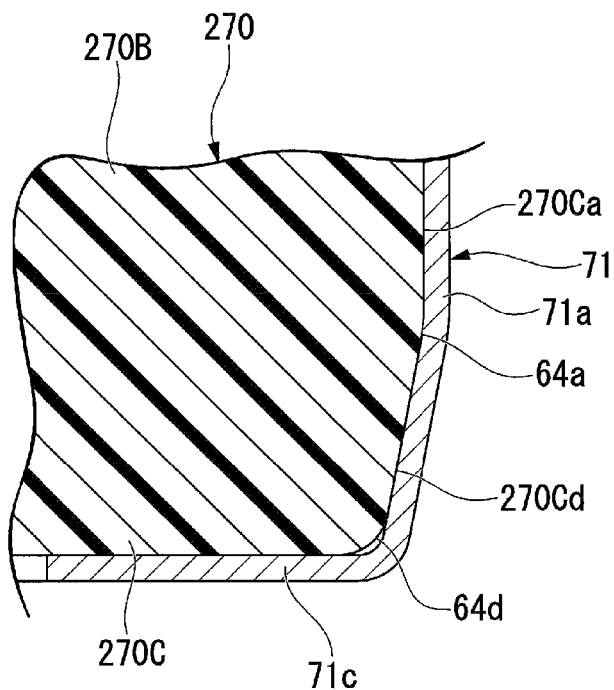
FIG. 31 is an enlarged cross-sectional view corresponding to a XXXI part in FIG. 25 of a rotor of Modification example 1 of the third embodiment.

FIG. 31 is an enlarged cross-sectional view corresponding to a XXXI part in FIG. 25 of the rotor of Modification example 1.

In the above embodiment, the small diameter part 270Cb is formed at the outer end of the end wall 270C of the load reception block 270 in the axial direction, the inclined surface 270Cc is disposed between the general part 270Ca and the small diameter part 270Cb, and the corner part 64a that is obtuse angle-shaped is disposed between the general part 270Ca and the inclined surface 270Cc. Thereby, the first caulking starting point and the second caulking starting point are arranged on the end wall 270C. On the other hand, in the load reception block 270 of the modification example, an inclined surface 270Cd that connects the general part 270Ca and the outer end surface of the end wall 270C in the axial direction is formed on the outer periphery of the end wall 270C. A corner part 64c having a gentle obtuse angle is formed on the general part 270Ca side of the inclined surface 270Cd, and a curved surface part 64d is formed at the outer end of the inclined surface 270Cd in the axial direction.

In the case of the modification example, the corner part 64c constitutes the first caulking starting point, and the curved surface part 64d constitutes the second caulking starting point. In the modification example, because the angle of the corner part 64c which is the first caulking starting point is gentler, the caulking work of the magnet cover 71 can be performed more easily.

Modification Examples 2 to 3 of Third Embodiment

Figure 32:
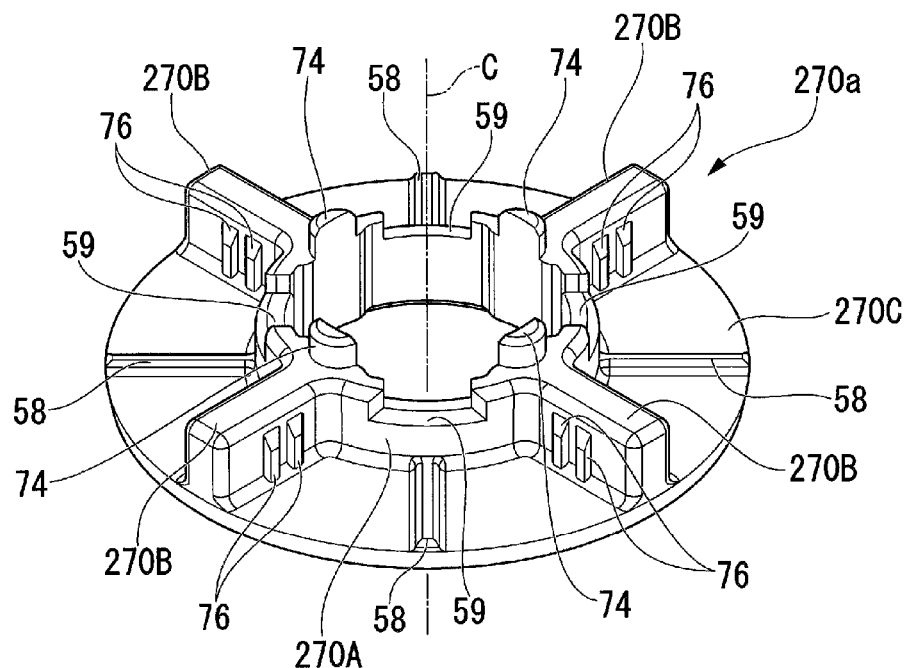
FIG. 32 is a perspective view of a load reception block of Modification example 2 of the third embodiment.
Figure 33:
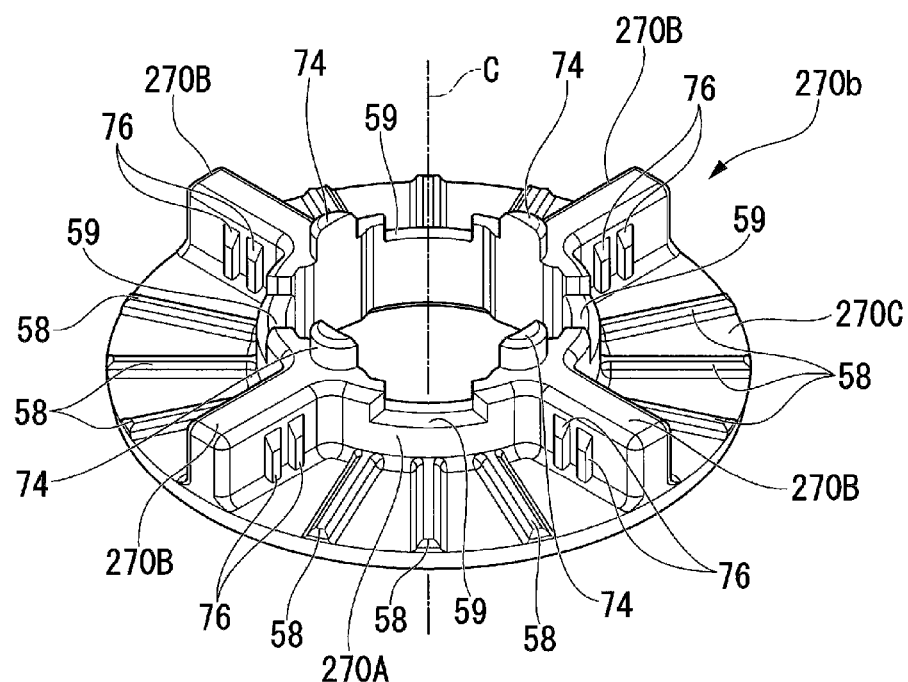
FIG. 33 is a perspective view of a load reception block of Modification example 3 of the third embodiment.

FIG. 32 is a perspective view of the load reception block 270a of Modification example 2, and FIG. 33 is a perspective view of the load reception block 270b of Modification example 3.

In the above embodiment, two reinforcing ribs 58 extending in the radial direction are arranged in a protruding state between the legs 270B adjacent to each other in the peripheral direction of the end wall 270C of the load reception block 270. However, as shown in FIG. 32, only one reinforcing rib 58 may be arranged in a radially protruding state between the legs 270B adjacent to each other in the peripheral direction of the end wall 270C. In addition, as shown in FIG. 34, three or more reinforcing ribs 58 may be arranged in a radially protruding state between the legs 270B adjacent to each other in the peripheral direction of the end wall 270C.

Modification Example 4 of Third Embodiment

Figure 34:
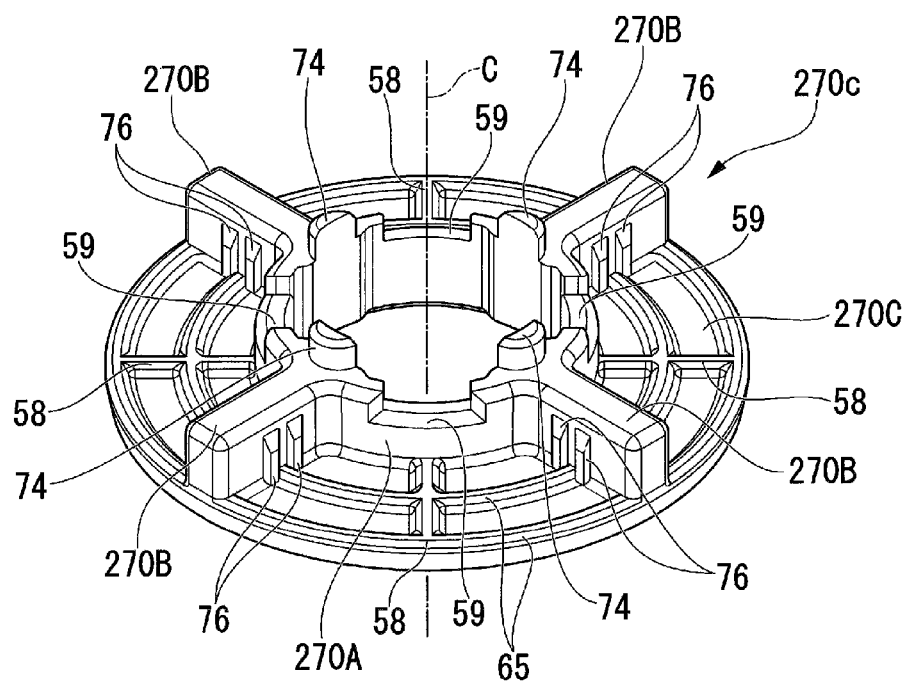
FIG. 34 is a perspective view of a load reception block of Modification example 4 of the third embodiment.

FIG. 34 is a perspective view of the load reception block 270c of Modification example 4.

In the load reception block 270c of Modification example 4, in addition to the reinforcing rib 58 extending in the radial direction, a peripheral-direction rib 65 extending along the circumferential direction of the end wall 270C is arranged in a protruding state between the legs 270B adjacent to each other in the peripheral direction of the end wall 270C. The number of the reinforcing ribs 58 or the peripheral direction ribs 65 can be arbitrarily set.

In the case of Modification example 4, because the reinforcing rib 58 extending in the radial direction and the peripheral direction rib 65 are arranged in a protruding state on the end wall 270C, the deformation such as dents, waviness, and the like can be more reliably suppressed in the peripheral region of the end wall 270C, and the rigidity of the outer peripheral edge of the end wall 270C can also be further increased.

Moreover, the present invention is not limited to the above embodiments, and various design changes can be made without departing from the gist of the present invention.

What is claimed is:

1. A rotor, comprising:
   a rotor core that comprises a plurality of steel sheets laminated along an axial direction of a rotation axis of the rotor;
   a plurality of permanent magnets arranged on an outer peripheral part of the rotor core;
   a substantially tubular magnet cover that covers an exterior of the rotor core and the plurality of permanent magnets in a radial direction; and
   a pair of load reception blocks that are arranged on both end surfaces of the rotor core in the axial direction respectively, wherein
   the rotor core has
   a substantially cylindrical core main body part, and
   a plurality of salient poles protruding in the radial direction from an outer peripheral surface of the core main body part;
   the plurality of permanent magnets are disposed between the plurality of adjacent salient poles;
   the magnet cover has:
   a peripheral wall that covers the exterior of the rotor core and the plurality of permanent magnets in the radial direction, and
   a pair of flange parts which are bent radially inward and arranged on both ends of the peripheral wall in the axial direction respectively; and
   each of the load reception blocks has:
   an annular part that abuts against an end surface of the core main body part in the axial direction, and
   a plurality of legs that protrude in the radial direction from an outer peripheral surface of the annular part and abut against an end surface of each of the salient poles in the axial direction,
   each of the load reception blocks is held between the corresponding one of the flange parts and the rotor core in the axial direction, and
   the plurality of salient poles are held between the plurality of legs in the axial direction,
   wherein the steel sheets adjacent in the axial direction are embedded with each other in a concave-convex manner at portions other than the plurality of salient poles.

2. The rotor according to claim 1, wherein a thickness of each of the plurality of salient poles along the radial direction is larger than a thickness of the core main body part along the radial direction.

3. The rotor according to claim 1, wherein
   each of the load reception blocks further has an end wall that is integrally connected to an axially outer side of the annular part and the legs and protrudes radially outward from the annular part,
   an outer surface of the end wall in the axial direction is formed flat, and one of the flange parts is caulked on the end wall of one of the pair of load reception blocks.

4. A motor, comprising:
   the rotor according to claim 1; and
   a stator that generates a magnetic field to rotate the rotor.

5. A method for manufacturing the rotor according to claim 1, comprising:
   a temporarily assembling step of assembling an assembly that arranges the plurality of permanent magnets on the outer peripheral part of the rotor core and temporarily assemble the pair of load reception blocks on the both end surfaces of the rotor core in the axial direction in this state;
   a first flange part forming step of forming one of the flange parts at one end side in the axial direction of the magnet cover;
   an inserting step of inserting the assembly into the magnet cover from another end side in the axial direction after the temporarily assembling step and the first flange part forming step; and
   a second flange part forming step of forming another one of the flange parts at another end side in the axial direction of the magnet cover and pressing the flange part against an end surface of each of the legs of the corresponding one of the load reception blocks after the inserting step.

6. A rotor, comprising:
   a rotor core that comprises a plurality of steel sheets laminated along an axial direction of a rotation axis of the rotor;
   a plurality of permanent magnets arranged on an outer peripheral part of the rotor core;
   a substantially tubular magnet cover that covers an exterior of the rotor core and the plurality of permanent magnets in a radial direction; and
   a pair of load reception blocks that are arranged on both end surfaces of the rotor core in the axial direction respectively, wherein
   the rotor core has
   a substantially cylindrical core main body part, and
   a plurality of salient poles protruding in the radial direction from an outer peripheral surface of the core main body part;
   the plurality of permanent magnets are disposed between the plurality of adjacent salient poles;
   the magnet cover has:
   a peripheral wall that covers the exterior of the rotor core and the plurality of permanent magnets in the radial direction, and
   a pair of flange parts which are bent radially inward and arranged on both ends of the peripheral wall in the axial direction respectively; and
   each of the load reception blocks has:
   an annular part that abuts against an end surface of the core main body part in the axial direction, and
   a plurality of legs that protrude in the radial direction from an outer peripheral surface of the annular part and abut against an end surface of each of the salient poles in the axial direction,
   each of the load reception blocks is held between the corresponding one of the flange parts and the rotor core in the axial direction, and
   the plurality of salient poles are held between the plurality of legs in the axial direction,
   wherein each of the load reception blocks further has an end wall that is integrally connected to an axially outer side of the annular part and the legs and protrudes radially outward from the annular part,
   an outer surface of the end wall in the axial direction is formed flat, and
   one of the flange parts is caulked on the end wall of one of the pair of load reception blocks.

7. The rotor according to claim 6, wherein a thickness of each of the plurality of salient poles along the radial direction is larger than a thickness of the core main body part along the radial direction.

8. A motor, comprising:
   the rotor according to claim 6; and
   a stator that generates a magnetic field to rotate the rotor.

9. A method for manufacturing the rotor according to claim 6, comprising:
- a temporarily assembling step of assembling an assembly that arranges the plurality of permanent magnets on the outer peripheral part of the rotor core and temporarily assemble the pair of load reception blocks on the both end surfaces of the rotor core in the axial direction in this state;
- a first flange part forming step of forming one of the flange parts at one end side in the axial direction of the magnet cover;
- an inserting step of inserting the assembly into the magnet cover from another end side in the axial direction after the temporarily assembling step and the first flange part forming step; and
- a second flange part forming step of forming another one of the flange parts at another end side in the axial direction of the magnet cover and pressing the flange part against an end surface of each of the legs of the corresponding one of the load reception blocks after the inserting step.

\* \* \* \* \*